(12) United States Patent
Yushin et al.

(10) Patent No.: US 10,026,962 B2
(45) Date of Patent: Jul. 17, 2018

(54) ALGINATE-CONTAINING COMPOSITIONS FOR USE IN BATTERY APPLICATIONS

(71) Applicants: CLEMSON UNIVERSITY RESEARCH FOUNDATION, Clemson, SC (US); GEORGIA TECH RESEARCH CORPORATION, Atlanta, GA (US)

(72) Inventors: Gleb Yushin, Atlanta, GA (US); Igor Luzinov, Central, SC (US); Bogdan Zdyrko, Clemson, SC (US); Oleksandr Magazynskyy, Atlanta, GA (US); Igor Kovalenko, Atlanta, GA (US)

(73) Assignees: Georgia Tech Research Corporation, Atlanta, GA (US); Clemson University Research Foundation, Clemson, SC (US)

( * ) Notice: Subject to any disclaimer, the term of this patent is extended or adjusted under 35 U.S.C. 154(b) by 69 days.

(21) Appl. No.: 14/150,374

(22) Filed: Jan. 8, 2014

(65) Prior Publication Data
US 2014/0193712 A1 Jul. 10, 2014

Related U.S. Application Data

(60) Division of application No. 13/227,471, filed on Sep. 7, 2011, now Pat. No. 8,652,688, which is a continuation-in-part of application No. PCT/US2011/035072, filed on May 3, 2011.

(60) Provisional application No. 61/330,461, filed on May 3, 2010, provisional application No. 61/358,465, filed on Jun. 25, 2010.

(51) Int. Cl.
  H01M 4/62 (2006.01)
  H01M 4/133 (2010.01)
  H01M 4/134 (2010.01)
  H01M 2/16 (2006.01)

(52) U.S. Cl.
  CPC .......... *H01M 4/622* (2013.01); *H01M 2/16* (2013.01); *H01M 4/133* (2013.01); *H01M 4/134* (2013.01)

(58) Field of Classification Search
  CPC ....... H01M 4/133; H01M 4/134; H01M 4/622
  USPC ................................................ 429/217, 232
  See application file for complete search history.

(56) References Cited

U.S. PATENT DOCUMENTS

| | | | |
|---|---|---|---|
| 6,226,173 B1 * | 5/2001 | Welsch et al. ............... 361/508 |
| 6,235,427 B1 | 5/2001 | Idota et al. | |
| 6,406,817 B2 | 6/2002 | Wariishi et al. | |
| 7,592,095 B2 | 9/2009 | Lee et al. | |
| 2002/0045097 A1 | 4/2002 | Ikeda et al. | |
| 2002/0086211 A1 | 7/2002 | Umeno et al. | |
| 2003/0198870 A1 | 10/2003 | Wariishi et al. | |
| 2004/0126659 A1 | 7/2004 | Graetz et al. | |
| 2005/0013877 A1 | 1/2005 | Jellum et al. | |
| 2006/0020923 A1 | 1/2006 | Lo et al. | |
| 2006/0160250 A1 | 7/2006 | Bonassar et al. | |
| 2007/0122700 A1 | 5/2007 | Miyachi et al. | |
| 2008/0063931 A1 | 3/2008 | Zucker et al. | |
| 2009/0130562 A1 | 5/2009 | Mao et al. | |
| 2009/0185941 A1 | 7/2009 | Breznova et al. | |
| 2011/0123866 A1 * | 5/2011 | Pan et al. ...................... 429/221 |
| 2012/0156562 A1 | 6/2012 | Kobayashi et al. | |

FOREIGN PATENT DOCUMENTS

| CA | 2709868 A1 | 7/2009 |
|---|---|---|
| WO | 2011024797 A1 | 3/2011 |

OTHER PUBLICATIONS

Cui et al., "Carbon-Silicon Core-Shell Nanowires as High Capacity Electrode for Lithium Ion Batteries", NANO Letters, 2009, vol. 9, No. 9, pp. 3370-3374.*
Guo et al: "Silicon/Disordered Carbon Nanocomposites for Lithium-Ion Battery Anodes"; Journal of the Electrochemical Society; 152 (11); A2211-A2216 (2005).
Search Report for PCT/US2010/050794 dated Dec. 17, 2010.
Written Opinion for PCT/US2010/050794 dated Dec. 17, 2010.
International Preliminary Examination Report for PCT/US2010/050794 dated Apr. 3, 2012.
Search Report for PCT/US2010/056876 dated Mar. 9, 2011.
Written Opinion for PCT/US2010/056876 dated Mar. 9, 2011.
International Preliminary Examination Report for PCT/US2010/050794 dated May 22, 2012.
Search Report for PCT/US2011/035072 dated Aug. 26, 2011.
Written Opinion for PCT/US2011/035072 dated Aug. 26, 2011.
International Preliminary Examination Report for PCT/US2011/035072 dated Nov. 6, 2012.

* cited by examiner

*Primary Examiner* — Ladan Mohaddes
(74) *Attorney, Agent, or Firm* — Steven Driskill

(57) ABSTRACT

A silicon-based anode comprises an alginate-containing binder. The many carboxy groups of alginate bind to a surface of silicon, creating strong, rigid hydrogen bonds that withstand battery cycling. The alginate-containing binder provides good performance to the anode by (1) improving the capacity of the anode in comparison to other commercially-available binders, (2) improving Columbonic efficiency during charging and discharging cycles, and (3) improving stability during charging and discharging cycles.

11 Claims, 20 Drawing Sheets

ALGINATE-CONTAINING COMPOSITIONS FOR USE IN BATTERY APPLICATIONS

PRIORITY CLAIM

This application is a Divisional of U.S. patent application Ser. No. 13/227,471 filed Sep. 7, 2011, which is a Continuation-in-part of PCT Application No. PCT/US2011/35072 filed May 3, 2011, which claims the benefit of U.S. Provisional Patent Application Ser. Nos. 61/330,461 and 61/358,465, filed 3 May 2010 and 25 Jun. 2010, respectively, all of which are incorporated herein by reference in their entirety as if fully set forth below.

BACKGROUND OF THE INVENTION

1. Field of the Invention

The various embodiments relate generally to polymer binders for porous composites used in energy storage devices, such as electrodes in primary and secondary batteries, double-layer capacitors, electrochemical capacitors, supercapacitors, electrochemical capacitor-battery hybrid devices, as well as dense (non-porous) composite dielectric layers in dielectric capacitors, and polymer separators for use in primary and secondary batteries, electrochemical capacitors, supercapacitors, double-layer capacitors, and electrochemical capacitor-battery hybrid devices.

2. Description of the Relevant Art

Growing efficient materials, components, and structures from plants are of the highest interest for the sustainable future, due to the preservation of the environment during the plant growing processes and a plant's ability to efficiently capture carbon dioxide. Particularly attractive are marine plants, such as algae, that can be grown on non-agricultural land, such as salt water or waste water, and need only a fraction of the area required by conventional crops.

Due to rapidly increasing renewable energy demands, energy harvesting by ocean plants has drawn interest in recent years. Equally important is the development of high-performance, eco-efficient components for energy storage devices, such as batteries. Several breakthroughs have recently been achieved in the formation of organic cathodes and anodes for lithium-ion batteries. These bio-derived active materials show great promise, however they offer limited stability and capacity properties.

A typical procedure for the preparation of Li-ion battery electrodes includes mixing electro-active powder with conductive carbon additives and a polymeric binder dissolved in a solvent. The produced slurry is then casted on metal foil current collectors and dried. Traditionally, most research has been focused on synthesis of active powders with improved properties and less attention was devoted to the advancement of the electrically inactive components of battery electrodes, such as binders. Yet, recent studies have shown that many important battery characteristics, including stability and irreversible capacity losses, are critically dependent on the binder's properties. High capacity electrochemically active particles that exhibit significant volume changes during insertion and extraction of Li require improved binder characteristics to ensure electrode integrity during use. Si, in particular, exhibits the largest volume changes during Li-ion battery operation. The interest in Si-based anodes stems from the abundance of Si in nature, its low cost, and its high theoretical capacity, which is an order of magnitude higher than that of the conventionally used graphite.

Recent studies have shown that synthetic and bio-derived polymers which contain carboxy groups, such as polyacrylic acid (PAA) and carboxymethyl cellulose (CMC), demonstrate promising characteristics as binders for Si-based anodes. Low binder extensibility did not demonstrate a negative effect on the battery performance. Reasonably stable anode performance, however, could only be achieved when Si volume changes were minimized by incomplete Li insertion in the tests or accommodated by using extra-large binder content, which lowers the resulting anode capacity. The polar hydrogen bonds between the carboxy groups of the binder and the $SiO_2$ on the Si surface were proposed to exhibit a self-healing effect and reform if locally broken. An alternative explanation for the observed stability of the rigid binders with lower extensibility could be that Si nanoparticles deform plastically during electrochemical alloying with Li, expanding towards the existing pores between the particles.

SUMMARY OF THE INVENTION

Various embodiments of the present invention provide an energy storage device, comprising at least one electrode, wherein the at least one electrode comprises an alginate-containing composition. In exemplary embodiments, the alginate-containing composition is a binder. The alginate-containing composition can form a porous film that binds to at least a portion of a surface of the at least one electrode.

The alginate-containing composition can be alginate, alginic acid, or a salt of an alginic acid. Further, the salt of the alginic acid can be Na, Li, K, Ca, $NH_4$, Mg, or Al salt of alginic acid. The alginate-containing composition can have a molecular weight of about 10,000 to about 600,000. In exemplary embodiments, the alginate containing composition has a molecular weight of about 200,000. The alginate-containing composition can be chemically or physically cross-linked. Further, the alginate-containing composition can comprise another polymer grafted with, cross-linked with, or blended with alginate. The polymer can be a water soluble polymer, organic soluble polymer, insoluble polymer, or combinations thereof.

In some embodiments, the alginate-containing composition can be about 0.5 weight percent to about 60 weight percent of the at least one electrode. In other embodiments, the alginate-containing composition can be about 2 weight percent to about 25 weight percent of the at least one electrode. In exemplary embodiments where the alginate-composition forms the porous film, the porous film can have a thickness of about 1 micron to about 40 microns.

In other exemplary embodiments, the alginate-containing composition can be a separator. The alginate-containing separator can be formed as a coating on the electrode or formed as a stand-alone separator.

The energy storage device of the various embodiments can be an electric double layer capacitor, a supercapacitor, an electrochemical capacitor, a primary battery, a secondary battery, a battery-electrochemical capacitor hybrid device, or an electrochemical energy storage device.

Other exemplary embodiments of the present invention provide a dielectric capacitor, comprising at least one dielectric layer, wherein the at least one dielectric layer comprises an alginate-containing composition. The alginate-containing composition can be a binder for particles having a dielectric constant in the range of about 3 to about 60,000. The thickness of the at least one dielectric layer can be about 0.05 microns to about 50 microns. In exemplary embodiments, the alginate-containing composition can be about 0.8 weight percent to about 80 weight percent of the at least one dielectric layer. In other exemplary embodiments, the alginate containing composition has a molecular weight of about 500 to about 800,000.

BRIEF DESCRIPTION OF THE DRAWINGS

Advantages of the present invention will become apparent to those skilled in the art with the benefit of the following detailed description of embodiments and upon reference to the accompanying drawings in which.

Figure 1A:
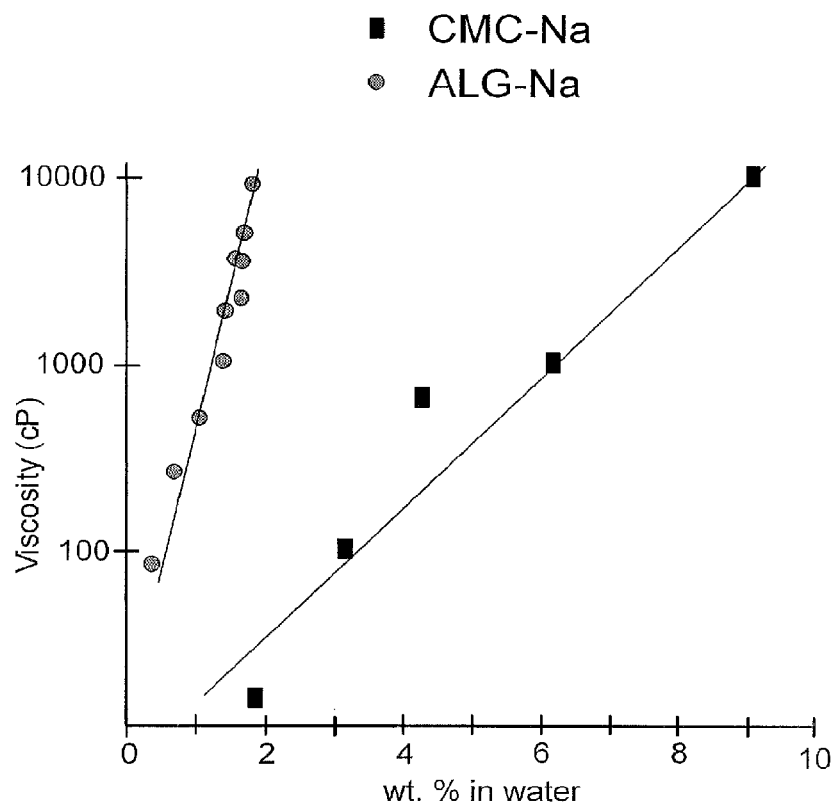
FIGS. 1A-C graphically compare viscosities of sodium alginate (Na alginate) and sodium carboxymethyl cellulose (Na CMC) binders as a function of weight percent (wt. %) in water, as a function of the shear rate, and as a function of temperature.

While the invention may be susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF THE PREFERRED EMBODIMENTS

Exemplary embodiments of the present invention will be described herein in detail. Throughout this description, various components can be identified as having specific values or parameters, however, these items are provided as exemplary embodiments. Indeed, the exemplary embodiments do not limit the various aspects and concepts of the present invention as many comparable parameters, sizes, ranges, and/or values can be implemented.

It should also be noted that, the singular forms "a," "an," and "the" include plural references unless the context clearly dictates otherwise. For example, reference to a component is intended also to include composition of a plurality of components. References to a composition containing "a" constituent is intended to include other constituents in addition to the one named. It is intended that each term contemplates its broadest meaning as understood by those skilled in the art and includes all technical equivalents which operate in a similar manner to accomplish a similar purpose.

Values may be expressed herein as "about" or "approximately" one particular value, this is meant to encompass the one particular value and other values that are relatively close but not exactly equal to the one particular value. By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named. It is also to be understood that the mention of one or more method steps does not preclude the presence of additional method steps or intervening method steps between those steps expressly identified. Similarly, it is also to be understood that the mention of one or more components in a composition does not preclude the presence of additional components than those expressly identified.

The term "nanoparticles" as used herein refers to refers to particles that have an average diameter in the range of 500 nanometers to 1 nanometer; or from 250 nanometers to 10 nanometers, or from 100 nanometers to 20 nanometers.

The various embodiments of the present invention generally relate to the use of alginate-containing compositions in energy storage devices. More specifically, exemplary embodiments of the present invention relate to the use of alginate-containing compositions as binders for electrodes in energy storage devices, such as electrical double layer capacitors, electrochemical capacitors, supercapacitors, primary and secondary batteries and various electrochemical capacitor-battery hybrid devices. More specifically, exemplary embodiments of the present invention relate to the use of alginate-containing compositions as binders for lithium-ion battery electrodes.

Due to millions of years of evolution, the molecular architecture of alginates have been optimized to facilitate growth and survival of brown algae and many microorganisms in strong electrolyte environments, which is desirable for energy storage devices, such as batteries. Brown algae, rich in alginates, is not only one of the fastest growing plants on the planet, but is also the longest and the heaviest of all the seaweeds, therefore enhancing the accessibility of alginate and, consequently, lowering its cost. Alginate (commonly in a sodium salt form) can be extracted from algae by heating the algae in a hot soda ($Na_2CO_3$) solution. Alginate, also referred to as alginic acid, is a copolymer of 1→4 linked β-D-mannuronic acid (M) and α-L-guluronic acid (G) residues. Different compositions and sequences of M and G monoblocks in alginates yield a plethora of physical and biological properties, optimized in brown algae for a given environment, and thus are subject to change due to seasonal and growth conditions. For example, algae growing in coastal areas have higher G content than the same algae growing in streaming waters. A high content of G acid makes alginate gels more rigid. Multivalent ions from seawater can crosslink the matrix, also increasing the rigidity of the plant body. Different algae species and bacteria produce alginates with different G-M composition and monoblock lengths. Additionally, the alginate composition can be altered using enzymatic post-modification, making it a very versatile substance.

These unique alginate properties also make it desirable for use in energy storage devices, such as electrical double layer capacitors, supercapacitors, electrochemical capacitors, dielectric capacitors, electrochemical cells, secondary and primary batteries, or electrochemical energy storage devices. First, unlike many polysaccharides commonly found in terrestrial plants, alginates uniquely contain carboxylic groups at each monomeric unit of the polymer. This high content of carboxylic groups is desirable for energy storage device because carboxylic groups readily form rigid, hydrogen bonds with oxidized surfaces, which enhances the stability and mechanical strength of energy storage device components, for example, electrodes. Second, alginate easily dissolves in water. This solubility characteristic lowers manufacturing costs, simplifies processing steps, and makes alginate more environmentally friendly than other binders.

Alginate-containing compositions can be used in energy storage devices, for example, as a separator, a protective electrode coating, and/or a binder. More specifically, alginate-containing compositions can be used as binders in cathodes and anodes of batteries, for example lithium-ion (Li-ion) batteries, magnesium-ion (Mg-ion) batteries, aluminum-ion (Al-ion) batteries, or sodium-ion (Na-ion) batteries, to name a few. The carboxy groups in alginate bind well to most cathode and anode materials, (for example to Si or C or various metal oxides) and to current collectors, and provide stability and high Coulombic efficiency during charging and discharging cycles. Conventional binders currently used for silicon-based and graphite-based anodes, specifically, are carboxymethylcellulose ("CMC") (or its salts) and poly(vinylidene fluoride) ("PVDF"). These binders have many limitations. CMC comprises limited amounts of carboxylic groups capable of binding to the cathode or anode material. Other disadvantages of CMC are the lack of control over their configuration (placement of the carboxy groups in the macromolecules) and, more importantly, the need for rigorous chemical procedures for their synthesis. CMC synthesis, for example, involves the alkali-catalyzed reaction of cellulose with chloroacetic acid to introduce carboxy groups, which are responsible for its chemical reactivity and, in a salt form, solubility in water. Cellulose itself, a structural component for most plants, does not contain carboxy groups and is practically insoluble.

The PVDF binds to Si (or graphite) particles via relatively weak van-der-Waals forces and does not accommodate large changes in spacing between silicon particles caused by expanding and contracting during cycling. Thus, the conventional binders can be inefficient in holding the silicon particles together and maintaining electrical conductivity within the anode, which is important for efficient battery operation. Alginate-containing binders do not present these limitations. In addition, they allow active electrode particles to be uniformly dispersed in a slurry and thus allow very uniform electrode fabrication procedure, which is important for reproducible performance and good cycle life of the energy storage devices comprising such electrodes.

Silicon may be used as the high-capacity active material for a Li-ion battery anode. However, Si presents certain technical challenges, for example, as a Li-ion battery cycles, the electrochemical alloying (and dealloying) of silicon and lithium causes volume changes, particularly particle expansion upon lithium insertion into a silicon or silicon-lithium particle contraction during lithium extraction from a silicon-lithium alloy particle. Such volume changes can compromise the interface between the silicon and its binder, known as the solid-electrolyte interphase ("SEI"). For example, a portion of the binder may lift off the silicon, thus creating a void in the interface which allows electrolyte solvent remaining in the anode to possibly creep into the remaining portion of the interface, breaking the bonding between the binder and the silicon, and destroying the interface. If the interface is damaged, the interface may not be strong enough to be maintained when the silicon swells. Further, when an electrolyte solvent enters the SEI and reaches Si, electrolyte decomposes which contributes to the growth of the SEI and loss of Li, which, in turn decreases the overall cycle life of the anode. Alginate-containing binders provide the rigidity and chemical properties necessary for desirable battery operation.

In exemplary embodiments, alginate-containing compositions are used as binders in silicon-based anodes for Li-ion batteries. The source of the silicon in the silicon-based anodes includes silicon particles in the form of spheres, agglomerates, needles, rods, fibers, nanotubes and various other forms of silicon. The source can also be silicon-carbon composite materials, wherein such composite refers to mixing of silicon particles with carbon, coating silicon particles with carbon, coating carbon particles with silicon, creating three-dimensional dendritic particle structures by coating carbon with silicon and again with carbon, and other variations involving chemical and physical combinations of silicon and carbon. In exemplary embodiments, the silicon-carbon composite can contain about 50 weight percent to about 95 weight percent silicon and about 5 weight percent to about 50 weight percent carbon. The source of silicon can also be silicon alloys, such as alloys with X (where X is N, Ge, Be, Ag, Al, Mg, Cd, Ga, In, Sb, Sn, and Zn), that are capable of forming a better solid-electrolyte interphase (SEI) on the Si—X surface than pure silicon. It should be understood that while the disclosure herein primarily references silicon-based anodes for Li-ion batteries, other electrode (inclusive of cathodes and anodes) materials, such as other materials that electrochemically alloy with lithium (such as Sn, Ge, Mg, Al, and others), as well as graphite, graphene, various graphitic and disordered carbons, carbon-containing composite materials, electrochemically active polymers capable of storing ions, phosphorous, tin oxide, iron, iron oxide, zinc, manganese, nickel, sulfates, titanium oxide, sulfur (S), carbon-sulfur composites, various other sulfur-containing composites, various transition metal nitrides, transition metal oxides (such as iron oxides, vanadium oxides, molybdenum oxides, among others), transition metal sulphides (such as TiS, $TiS_3$, $MoS_2$, among others), various lithium containing metal oxides (such as $LiCoO_2$, $LiMnO_2$, $LiNiO_2$, $LiMn_2O_4$, $LiFePO_4$, $LiFeVO_4$, $LiMn_xCo_yO_z$, various other oxides with the general formula of $Li_xM_yN_zOF_a$, where M is selected from a first group consisting of Ni, Mn, V, and Co; N is selected from a second group consisting of transition metals and phosphorus; M and N are non-identical; Li is lithium, O is oxygen, and F is fluorine; and wherein subscripts x, y, z, and a are non-zero or zero), lithium silicates, and various other ion-hosting materials can be used in place of Si for electrodes in primary and rechargeable Li-ion batteries. Furthermore, materials other than Si can be used with alginate-containing compositions for Mg-ion, Al-ion, Na-ion and other metal-ion batteries, other types of primary and rechargeable batteries, electrical double layer capacitors, electrochemical capacitors, supercapacitors, and various electrochemical capacitor-battery hybrid devices. One skilled in the art will appreciate that the examples described herein are not solely limited to silicon-based anodes for Li-ion batteries and can also apply to anodes for electrochemical energy storage devices having other active materials and to cathodes for electrochemical energy storage devices having different active materials. Finally, alginate-containing compositions can be used as binders for ceramic particles for use in a dielectric layer in polymer-ceramic composite dielectric capacitors.

It should be understood that in the electrodes containing alginate and active (anode or cathode) materials other components may be added as well. These include various conductive additives (such as carbon, metals and conductive polymers) as well as other functional materials that are added to improve the battery cycle life or power characteristics or safety or other useful functions.

It should be understood that while the disclosure herein primarily references sodium salt of alginic acid (Na-alginate), other types of alginate, such as alginic acid and various other salts of alginic acid (such as potassium (K) alginate, calcium (Ca) alginate, ammonium ($NH_4$) alginate, lithium (Li) alginate, aluminum (Al) alginate, magnesium (Mg) alginate, among other salts of alginic acid) can be used as well.

The lithium salt of alginate may be preferred for lithium ion batteries. The first cycle irreversible capacity losses of Si-containing electrodes may often range from 200 to 600 mAh/g, which is too high for many applications and highly undesirable. The inventors have discovered that the use of Li salt of alginate reduces such irreversible capacity losses during the first cycle and often provides better cycle stability of the anodes, including Si-containing anodes in particular. Exemplary electrolytes are based on Li salts electrochemically stable in the electrochemical window and temperature range from −30 C to 70 C, such as $LiPF_6$, $LiN(CF_3SO_2)_2$ and their combinations, to name a few. It is preferred for the electrode to have a powdered active material capable of undergoing lithiation and delithiation and a binder containing 10 to 100 weight percent of lithium salt of alginate. The active material preferably contains 50 to 100 weight percent Si and 0 to 50 weight percent C and the amount of the binder ranges from 5 to 20 weight percent of the total electrode composition.

It should be further understood that while the disclosure herein primarily references alginate, other natural or synthetic polymers, mixed, blended or cross-linked with alginate can be used as well. Examples of suitable polymers include but are not limited to cellulose ethers, or guar, or their derivatives or polymers composed of diene and other unsaturated (vinyl) monomers or their salts. Such diene monomers include 1,3 butadiene, isoprene, chloroprene, cyclobutadiene and divinyl benzene. Unsaturated monomers include alkyl acrylates, hydroxylated alkyl methacrylates, alkyl vinyl ketones, substituted acrylamides, methacrylic acid, N-methylol acrylamide, 2-hydroxyethyl acrylate, cronic acid, itaconic acid, fumaric acid, maleic acid, maleic anhydride, vinyl halides, vinylidene halides, vinyl esters, vinyl ethers, vinyl carbazole, N-vinyl pyrrolidone, vinyl pyridine, chlorostyrene, alkyl styrene, ethylene, propylene, isobutylene, vinyl triethoxy silane, vinyl diethylmethyl silane, vinyl methyl dichloro silane, vinyl diethylmethyl silane, vinyl methyl dichloro silane, triphenyl vinyl silane, methyl methacrylate, vinyl acetate, acrylonitrile, acrylic acid, acrylamide, maleic anhydride, monovinyl silicon compounds, ethyl vinyl ether, chlorostyrene, vinyl pyridine, butyl vinyl ether, 2-ethylhexyl acrylate, isoprene, chloroprene, vinylidene chloride, butyl vinyl ether and styrene, to name a few. Suitable cellulose ethers, guars and their derivatives include but are not limited to carboxymethyl cellulose (CMC), hydroxyethyl cellulose, carboxymethylhydroxyethyl cellulose, ethyl hydroxyethyl cellulose, methylcellulose, hydrroxypropyl cellulose, methylhydroxyethyl cellulose, ethyl guar, methylhydroxypropyl cellulose, cationic guar, carboxymethyl guar, hydroxypropyl guar, carboxymethyl hydroxypropyl guar, to name a few. Other polysaccharides and their derivatives can be utilized as well. Examples include, but not limited to dextran, pectins, starch, heparin, fucoidan and various sulfonated forms of polysaccharides.

Desirable performance characteristics of silicon-based anodes include high specific capacity, high Coulombic efficiency and long cycle life during charging and discharging cycles. Accordingly, alginate-containing binders provide good performance to the anode by (1) improving the capacity of the anode in comparison to other commercially-available binders, (2) improving Coulombic efficiency during charging and discharging cycles, and (3) improving stability during charging and discharging cycles.

The carboxy groups of the various embodiments of the alginate-containing binder described herein interact strongly with $SiO_2$ (present on silicon particle surfaces) via rigid, polar hydrogen bonding. This bonding exhibits self-healing effects and reform when locally broken, thus enabling silicon-based anodes to withstand silicon cycles of expansion and contraction during charging and discharging cycles. These characteristics are desirable, particularly for silicon-based anodes, because silicon exhibits large volume changes during insertion and extraction of lithium during lithium-ion battery operation. These large volume changes cause silicon-based anodes to degrade quickly. The use of silicon-based anodes, however, remains desirable because of silicon's abundance in nature, low cost and high theoretical capacity, an order of magnitude higher than that of traditionally used graphite. Stability and irreversible capacity losses of silicon-based anodes, specifically are linked to the binders' properties, thus the strong and rigid binding between the carboxy groups in alginate-containing binders and silicon particles slows the overall degradation rate and improves the stability of silicon-based anodes.

As described above, volume changes can compromise the SEI, which causes a portion of the binder to lift off the silicon, which creates voids in the interface which allows solvent remaining in the anode to creep into the remaining portion of the interface and break the bonding between the binder and the silicon, thus destroying the interface. A protective film is therefore desirable to prevent continuous access of an electrolyte solvent onto the surface of active silicon particles, which leads to electrolyte decomposition, degradation of the SEI layer and eventual electrical separation of active Si—Li particles upon their expansion and contraction at each charge-discharge cycle. Alginate-containing binders provide this protective film as they do not interact with conventional electrolyte solvents, thus if the SEI is compromised during expansion cycles, the alginate-containing binder can shield the silicon particles from electrolyte solvent that may compromise the performance of the silicon-based anode.

As described above, the alginate-containing binder can be, for example, alginic acid, a salt of aliginic acid (also called alginate salt). Alginate can be extracted from algae by heating algae in a hot soda ($Na_2CO_3$) solution, thus the alginate-containing binder is in a sodium salt form in exemplary embodiments. Further, because alginate is very easy to cross-link, the alginate-containing binder can be in either cross-linked or non-cross-linked form. Additionally, the alginate-containing binder can also comprise alginate salt cross-linked, blended with, or grafted with a polymer. The polymer can be, for example, other commercially available binders, such as CMC or other water-soluble polymers.

Figure 1B:
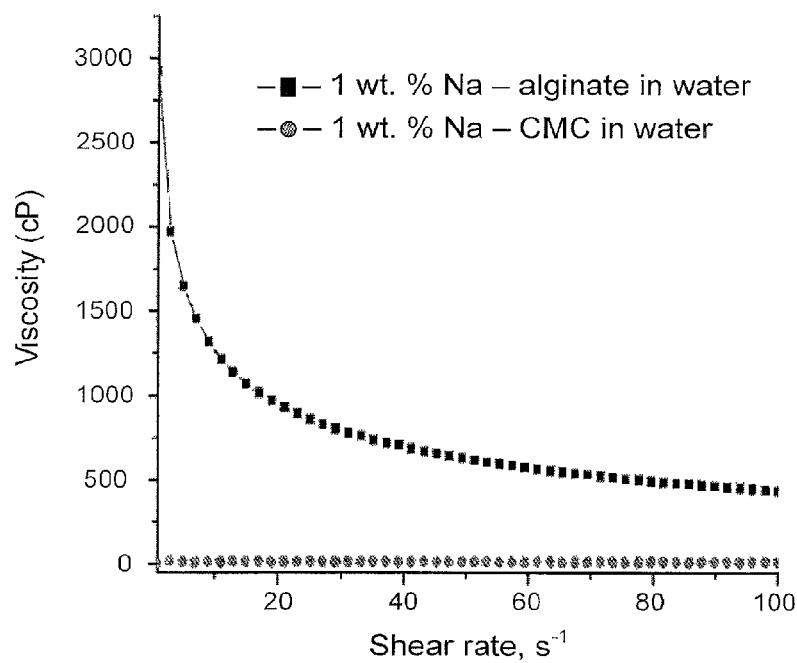
Figure 1C:
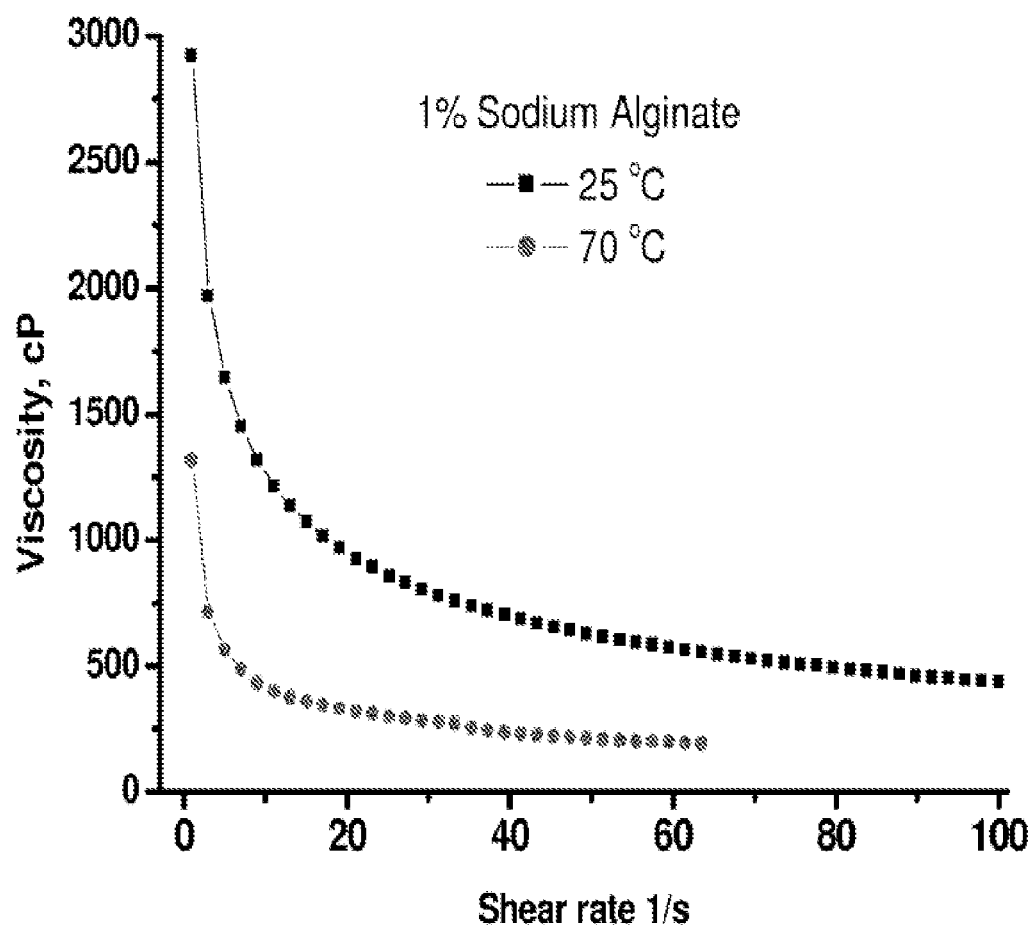

The alginate-containing binder demonstrates shear-thinning behavior. One skilled in the art will appreciate that the viscosity of an alginate-containing composition depends on how fast it is mixed (i.e., dissolved) in water. An increase in the mixing rate consequently decreases the viscosity of the alginate-containing composition and provides a more uniform distribution of the particles in the slurry used to prepare the electrode material. Conversely, if the alginate-containing composition is dissolved in water without mixing, the viscosity is increased, which effectively stabilizes the slurry from sedimentation. Further, the alginate-containing composition can comprise alginate compositions of many molecular weights. One skilled in the art will appreciate that an increase in molecular weight consequently increases the viscosity of the alginate-composition and, conversely, a decrease in molecular weight consequently decreases the viscosity. In exemplary embodiments the molecular weight of the alginate composition used for the binder can range from approximately 10,000 to 600,000, preferably 200,000, however the binder is not limited to these molecular weights. As an example, a comparison of the viscosities of sodium alginate and sodium CMC in water as a function of its weight percent in water are illustrated in FIGS. 1A and B. More specifically, FIGS. 1A and 1B show the viscosity of 1% sodium alginate and CMC solutions in water. Alginate solution viscosity is much higher relatively to CMC, which is critical for uniform slurry formation. CMC viscosity is very low (i.e., less than 50 cP, and cannot be accurately measured with equipment commonly used). To get a viscosity comparable to that of alginate, one needs significantly higher content of CMC in water. This high content of the binder is undesirable because it decreases the electrode electrical conductivity, increases its weight and may impede the ion transport through the electrode. If needed, the viscosity of the alginate-containing slurry can be decreased by increasing the slurry temperature (FIG. 1C). By varying viscosity one may optimize the slurry for the preparation of electrodes with the desired porosity levels. Some electrodes (such as Si) require sufficient pore volume available for the expansion during insertion of Li. Other electrodes, require only very small open pore volume. Therefore, capability to vary the slurry viscosity via changing the temperature and/or shear rate is critical for optimization of the electrode preparation.

Further, the alginate-containing binder can have many purity characteristics. For example, algae can be grown in waste water or salt water. One skilled in the art will appreciate that algae grown in saltwater is more pure than algae grown in waste water. However, alginate compositions extracted from both waste water and salt water can be used as a binder. One skilled in the art will also appreciate that waste water algae is less expensive, which consequently reduces costs associated with manufacturing. The versatility of alginate allows silicon-based anodes and other battery components to be customized to achieve desired parameters.

In exemplary embodiments, the alginate-containing binder can be about 0.5 weight percent to about 30 weight percent of the anode. In exemplary silicon-anode embodiments, the alginate-containing binder can be about 15 weight percent of the anode. In exemplary graphite-anode embodiments, the alginate-containing binder can be about 5 weight percent of the anode. In other exemplary embodiments, the silicon can be coated with a carbon coating to improve the electrical conductivity within the anode, improve the properties of the SEI, enhances temperature stability, and reduce degradation of the electrolytes, and the alginate-containing binder can be about 5 to 20 weight percent of the anode.

Further, other exemplary embodiments can also comprise a carbonate-based additive, such as vinylene carbonate (VC) or fluoroethylene carbonate (FEC) or combinations thereof, which helps seal the interface between the silicon and the electrolyte and improves stability of the SEI layer, so that these interfaces are not compromised during operation. The carbonate-based additive can be formulated into the electrolyte or into a carbonate-containing material operative to have time-dependent release rates of the carbonate during battery operation, battery storage, or during "formation cycles" performed by a battery manufacturer. The gradual rate of vinylene carbonate release can range, for example, from one day to three hundred days. The carbonate-releasing material can be in the form of particles added into the anode, cathode, or electrolyte, or can be a part of the membrane separating the cathode from the anode. This carbonate-containing material can be incorporated into the alginate-containing composition as a part of the alginate-containing binder or an alginate-containing separator or both.

In exemplary embodiments, the alginate-containing binder is combined with carbon-coated Si-containing composite particles with Si content in the range of 50 to 95 weight percent and surface area in the range from 2 to 100 $m^2/g$, and an electrolyte containing either FEC or VC additives or both in the amount ranging from 3 to 15 total weight percent. In another exemplary embodiment, the alginate-containing binder is combined with carbon-coated Si-containing composite particles with Si content in the range of 50 to 95 weight percent and surface area in the range from 2 to 100 m$^2$/g, and an electrolyte containing either FEC or VC additives or both in the amount from 3 to 15 total weight percent and containing propylene carbonate (PC) solvent in the amount ranging from 15 to 97 weight percent.

In a further embodiment, an imide salt is added to the electrolyte containing a solvent to improve the stability of the SEI and Si particles, to improve high temperature performance of the electrochemical cell with an alginate-containing electrode, to suppress the reaction between the organic solvent and the electrode material due to the presence of imide compound(s) that complex with the lithium ions, and the cycle characteristics of the Li-ion battery is improved. Preferable choices for the imide salts include lithium bis(trifluoromethane)sulfonamide, lithium bis(pentafluoroethanesulfonyl)imide, lithium cyclo-difluoromethanebis(sulfonyl)imide, lithium N-hydroxyphthalimide, lithium N-hydroxysuccinimide, lithium N,N-disuccinimidyl carbonate, lithium 1,5-bis(succinimidoxycarbonyloxy)pentane, lithium 9-fluorenylmethyl-N-succinimidyl carbonate, lithium N-(benzyloxycarbonyloxy)succinimide, and lithium Z-glycine-N-succinimidyl ester.

In an exemplary embodiment, the alginate-containing binder is combined with carbon-coated Si-containing composite particles with Si content in the range from 50 to 95 weight percent and surface area in the range from 2 to 100 m$^2$/g, an electrolyte containing either FEC or VC additives or both in the range from 3 to 15 total weight percent, and the imide salt of lithium bis(trifluoromethanesulfonyl) in the concentration ranging from 0.1 to 1.5 M. In another exemplary embodiment, the alginate-containing binder is combined with carbon-coated Si-containing composite particles, having Si content in the range from 50 to 95 weight percent and surface area in the range from 2 to 100 m$^2$/g, an electrolyte containing either FEC or VC additives or both in the amount ranging from 3 to 15 total weight percent, a propylene carbonate (PC) solvent in the amount ranging from 15 to 97 percent, and an imide salt of lithium bis (trifluoromethanesulfonyl) imide in the concentration ranging from 0.1 to 1.5 M. PC in the discussed embodiment was discovered to improve the kinetics of the electrochemical insertion/extraction of Li ions into/from Si-containing electrodes while providing improved SEI stability and better overall performance of the Li-ion cells with Si-containing electrodes.

The various embodiments of the silicon-based anode with alginate-containing binder can be manufactured in many ways. Silicon particles can be suspended in a solvent to create a suspension. In some examples the silicon particles can be silicon alloy particles with high silicon content, for example, silicon-germanium alloy particles, silicon-tin alloy particles, or silicon-germanium-tin alloy particles, with the atomic percentage of silicon in the silicon-germanium, silicon-tin or silicon-germanium-tin alloys ranging from 50 to 99.999%, preferably higher than 70%. In some examples the Si particles can be incorporated in a matrix comprising carbon or other materials.

In exemplary embodiments, the silicon is suspended in solvent at approximately 10% weight/volume of silicon weight to solvent volume. The solvent can be, for example but not limited to, methanol, ethanol, water, or any combinations thereof. In exemplary embodiments, the suspension is sonicated for approximately 60 minutes. In some embodiments, a carbon coating, for example but not limited to, a carbon coating produced by pyrolysis of polycarbonate, propylene, acetylene, or methane, is used to coat the surface of the silicon particles. In the various embodiments, the silicon particles can be as small as 10 nanometers (nm) or in excess of 30 microns. Even more specifically, the silicon particles can range between 100 and 800 nm. In embodiments wherein the silicon particles are coated with the carbon coating, the suspension can comprise 5 to 30 weight percent of carbon coating to silicon. The thickness of the coating typically depends on the viscosity of the suspension and the size of the silicon particles, but may be affected by other factors as well. Commonly, the thickness is selected in such a way as to provide the desired anode capacity per unit area to match with the capacity of the cathode. In some examples, conductive carbon additives are added together with silicon particles into the suspension to improve the electrical conductivity of the anode. The alginate-containing composition can then be added to the suspension. The suspension can then be stirred and subsequently sonicated. This enables the carboxy groups of the alginate-containing composition to bind to at least a portion of the oxidized silicon particle surface via strong hydrogen bonds. Vinylene carbonate (VC) or FEC or both or a material containing and capable of releasing VC or FEC or both if used, can then be added to the suspension.

In another exemplary embodiment, the alginate-containing electrode is prepared from a slurry composed of water, an alginate-containing binder, Si-containing particles, and optional conductive carbon additives with the solid-to-water weight ratio ranging from 1:3 to 1:40 and with alginate-to-particle weight ratio ranging from 1:20 to 1:1.5. The Si-containing particles can be various forms of silicon, silicon coated with carbon, carbon coated with silicon, silicon-carbon dendritic particles, or combinations thereof. The alginate-containing binder can be sodium alginate or lithium alginate, or combination thereof. The preferred preparation of such a slurry is dissolution of alginate in water under conditions needed to achieve the viscosity ranging from 10 cP to 20,000 cP, preferably in the range from 100 cP to 7000 cP, with addition of Si-containing particles and optional conductive carbon additives into this solution and mixing for 0.5 to 24 hours. This slurry is coated on a current collector and the coated current collector is dried at 80° C. to 160° C.

According to some embodiments of the present invention, an anode includes a porous composite comprising a plurality of agglomerated nanocomposites. At least one, and as many as all, of the plurality of nanocomposites includes a dendritic particle formed from a three-dimensional, randomly-ordered assembly of nanoparticles of an electrically conducting material and a plurality of discrete non-porous nanoparticles of a non-carbon Group 4A element or mixture thereof (i.e., silicon, germanium, tin, lead, and an alloy or solid solution thereof) disposed on a surface of the dendritic particle. At least one nanocomposite of the plurality of agglomerated nanocomposites has at least a portion of its dendritic particle in electrical communication with at least a portion of a dendritic particle of an adjacent nanocomposite in the plurality of agglomerated nanocomposites. In some cases, the electrically conducting material of the dendritic particle can be amorphous or graphitic carbon. For example, the amorphous carbon can be carbon black. The non-carbon Group 4A element or mixture thereof is silicon. In certain situations, the porous composite also includes an electrically conducting coating disposed on at least a portion of a surface of a dendritic particle of at least one of the plurality of agglomerated nanocomposites. The electrically conducting coating can be formed from carbon, too.

In an embodiment, dendritic particles may be formed from a plurality of discrete nanoparticles of the electrically conducting material. Dendritic particles may be formed by using a thermal treatment (e.g., sintering or annealing the particles together), sonication, chemically reacting the nanoparticles with one another, spontaneously (e.g., via a reduction in the surface energy of adjacent nanoparticles), and/or the like. In some embodiments, silicon nanoparticles may be disposed on the formed dendritic particles. In some embodiments, the silicon nanoparticles may be grown directly on the surface of the dendritic particle. Many deposition techniques can be used to do this, including, without limitation, physical vapor deposition and all of the variants thereof, chemical vapor deposition and all of the variants thereof, sputtering and all of the variants thereof, ablation deposition and all of the variants thereof, molecular beam epitaxy and all of the variants thereof, electro spray ionization and all of the variants thereof, and the like. In other embodiments, the silicon nanoparticles can be prepared independently, and then coupled to the surface of the dendritic particle using physical or chemical means. The coated or uncoated dendritic particles may be incorporated into an electrode of a lithium ion battery using an alginate binder.

It has been discovered that other natural or synthetic polymers, mixed, blended or cross-linked with alginate can be used to tune the viscosity of the alginate-containing electrode slurry. This is useful to tune the resulting porosity of the electrode for a fixed content of a binder and a solvent in order to achieve the most preferred performance in batteries. The solubility of the various types of natural or synthetic polymers results in different methods for creating the alginate-containing electrode slurry, which has a preferred total content of binder for Si-based anodes in the range from 7 to 20 wt. %. For water soluble natural and synthetic polymer additions, such as polyacrylic acid or carboxymethyl cellulose, a polymer slurry and an alginate slurry can be individually prepared and then mixed together before the slurry is coated onto a metal substrate. The water soluble natural or synthetic polymer additions can alternatively be mixed with the alginate in a high-speed mixer to create a dry blend and then the slurry prepared. For natural or synthetic polymers that are soluble in a solvent, such as polyethylene, polypropylene, ethylene-propylene-diene terpolymer (EPDM), and sulfonated EPDM, the alginate and polymer slurries can be prepared separately in two different solvents (water for the alginate and a water/alcohol solvent for the second polymer), and then combined. Alternatively, the organic soluble polymer can be added in the form of particles or fibers to the alginate slurry. For natural or synthetic polymers that are insoluble, such as cellulose nanofibers, an alginate-containing slurry can be prepared and the insoluble polymer is added as an insoluble additive.

In exemplary embodiments, electrodes composed of a mixed binder of polyacrylic acid (PAA) and alginate with Si-containing particles can be prepared by preparing two separate slurries, one an alginate slurry and the other a PAA slurry, and then combining these slurries before coating a metal substrate to create an electrode. The alginate slurry is composed of water, alginate, Si-containing particles and optional conductive carbon additives with the solid-to-water weight ratio ranging from 1:3 to 1:40 and with alginate-to-(Si containing particles) weight ratio ranging from 1:20 to 1:1.5. The preferred preparation of the alginate slurry includes dissolution of the alginate in water under conditions needed to achieve the viscosity ranging from 10 to 20,000 cP, the addition of Si-containing particles and optional conductive carbon additives into this solution and mixing for 0.5 to 24 hours. The separate PAA slurry is composed of water, alcohol (preferably ethanol), PAA (preferably having molecular weight in the range from 50,000 to 1,000,000), Si-containing particles, and optional conductive carbon additives with the solid-to-water weight ratio ranging from 1:2 to 1:15, the PAA-to-(Si containing particles) weight ratio ranging from 1:20 to 1:1.5, and the alcohol-to-water ratio ranging from 1:1000 to 1:5. The preferred preparation of the PAA slurry can include either (i) mixing the powders and optional conductive additives in a water-alcohol mixture (preferably ethanol) for up to 1 hour with the subsequent addition of PAA and further mixing for at least mixing for 0.5 to 24 hours, or (ii) a nearly complete dissolution of PAA in a water-alcohol mixture under conditions needed to achieve the viscosity ranging from 1 to 1,000 cP followed by the addition of Si-containing particles and optional conductive carbon additives to this solution and mixing for 0.5 to 24 hours. The alginate slurry and the PAA slurry are mixed together with the preferred weight ratio of PAA-to-alginate ranging from 5:1 to 1:5.

It has been discovered that alginate-containing compositions can also provide benefits to cathodes for Li-ion batteries as well as other primary and secondary batteries and electrochemical capacitors. Many cathode materials experience volume changes during insertion and extraction of ions, which may eventually lead to increase in the electrode resistance and to the mechanical degradation of the electrode, which will decrease the cycle lifetime of the batteries. Therefore, the capability of alginates to provide strong bonding between cathode particles, between cathode particles and conductive additives, and between cathode and the current collector, may be beneficial for the long cycle life of the batteries. Furthermore, in contrast to PVDF, which requires the use of expensive and environmentally-unfriendly organic solvents, alginates can use environmentally-friendly solvents (such as water), which will reduce the cost of the cathode and the full cell fabrication. In addition, many cathode materials experience degradations due to the side reactions with electrolyte. For example, hydrofluoric acid present in electrolyte may interact and dissolve the surface of many oxide-based cathodes. Many cathode materials experience partial degradation or partially dissolution of their surface layer during the battery operation. A coating of alginate-based binders on the surface of the cathode particle surface may protect these cathode particles, mitigate their degradation, and partially neutralize the harmful components of electrolyte. Finally, in order to achieve high quality of the electrodes (either cathodes or anodes), it is critical to have very high level of uniformity in both the slurry and the electrodes themselves. The ability of alginates to disperse cathode particles and form stable suspension within the slurry will be beneficial for achieving superior uniformity in the electrodes and thus more consistent performance and longer lifetime of the batteries. Overall, alginate-containing compositions will be beneficial for improving dispersion, adhesion strength, electrical connectivity and cycle life in both cathodes and anodes in various electrochemical energy storage devices.

It has been discovered that due to excellent mechanical properties of alginates, the alginate-containing composition may be used as a porous coating (from 1 to 40 micron in thickness; porosity level from 20 to 95 volume %) on the surface of an electrode for various energy storage devices, including Li-ion batteries. This alginate-containing porous film (containing from 1 to 100 wt. % alginate) has several useful functions. First, it strengthens the electrode. Second, it protects the electrode surface from mechanical damage. Third, it mitigates a possibility of a short circuit. Fourth, it may provide a function of a separator membrane. In this case, no additional separator membrane is needed, which reduces the cost of the battery fabrication. Conventionally, porous separator membranes have a thickness of 25 to 60 micron and contain thick pore walls in order to provide the needed mechanical support to the membrane. This minimizes the amount of small pores and increases the overall weight and the volume of the membrane. Small pores, however, are desired to minimize the possibility of the transport of conductive nanoparticles from one electrode to another, which may lead to short-circuit. Since the proposed alginate-containing porous coating is deposited on the surface of an electrode, it can be produced thinner than traditional separator membrane and have smaller pores. This will reduce the battery volume and weight, while increasing its power and reliability. Furthermore, functional groups in alginate (alginic acid or its salts) may favorably interact and neutralize the undesired components present in electrolyte, thus improving the overall life and safety of the batteries. This gives the fifth useful function to the porous alginate-containing polymer coating.

A separator placed between a cathode and an anode is one of critical components in the rechargeable lithium batteries. Its primary function is to effectively transport ionic charge carriers between the two electrodes as an efficient ionic conductor as well as to prevent the electric contact between them as a good electric insulator. A separator should be chemically and electrochemically stable and have mechanical strength sufficiently enough to sustain battery-assembly processes. In addition, it is often desirable for such separators to be wetted by a polar electrolyte solvent. Alginate-based separators were discovered to work particularly well. It was discovered that a porous alginate-containing coating of at least one electrode can function as a separator in an electrochemical cell composed of positive and negative electrodes. It was also discovered that a porous alginate-containing separator may be a stand-alone separator.

In exemplary embodiments, a porous alginate-containing separator coating can be prepared on an electrode by mixing an alginate-containing water solution with either (i) another polymer or (ii) polymeric (nano)particles or (iii) inorganic (nano)particles or (iiii) combination of (i-iii) to create a coating mixture and deposited the coating mixture onto an anode. In one example, after drying the coating mixture onto an anode, the (i) added polymer or the (ii or iii) nanoparticles can be dissolved with a selective solvent, leaving alginate intact, yet porous. The polymer added to the alginate-containing coating mixture should be soluble in solvent other than water to provide selective dissolution of the polymer while not of the alginate. Examples of such polymers include but are not limited to polyacrylic acid, polymethacrylic acid, polyethylene glycol, polyethelene imine, and polyallyl amine. In another example, the (ii or iii) nanoparticles are electrically insulating and can be left in the alginate-containing porous separator coating. The residual alginate coating on top of the electrode will be porous due to either dissolution of the part of the alginate coating or evaporation of water. In another example, the degree of porosity and the pore size of the separator coating can be tuned by varying amount of polymer and nanoparticles added; the size of the nanoparticles; and the amount of water in the initial coating slurry. In the case of nanoparticles added to the alginate solution to provide porosity, the nanoparticles can be either dissolved after coating formation or left in the coating. Polymer particles which can be dissolved most conveniently (but not limited to) can be prepared by emulsion polymerization from a variety of monomers. Examples include styrene, methacrylates, and acrylates. The synthesis of such nanoparticles is done in the presence of anionic surfactant to disperse the nanoparticles in the water and is necessary to prevent particle flocculation when mixed with alginate solution. Sodium dodecyl sulfate (SDS) is an example of an anionic surfactant that can be added for nanoparticle synthesis. Emulsion polymerization prepared polymer nanoparticles are added to the alginate-containing water solution before coating the mixture onto the anode. In the case of nanoparticles added to the alginate solution to achieve a desired pore size in the alginate-containing separator, the pore size strongly depends on the nature of the added second component (i, ii, or iii) of the alginate-containing separator coating. Addition of polymer may provide the smallest size of the pores. The sizes of the pores created can be as small as radius of gyration of the polymer molecules added and range from 2 to 20 nm. Larger pore size in the alginate-containing separator coating is created by addition of the polymeric (nano)particles or the inorganic (nano)particles and can range from 15 to 10,000 nm in diameter. Inorganic insulating nanoparticles (such as silicates, silica, alumina, zirconia and others) can also be added to the alginate to provide porosity. In the case of inorganic nanoparticles, such nanoparticles can be left in the coating intact. The resulting alginate-nanoparticles composite coating has an intrinsic porosity and can serve as porous inert coating eliminating necessity to add a stand-alone separator to the battery.

It has been discovered that it may be desirable that the alginate-containing separator coating does not fill the pores already existing in the actual electrode. To create the porous alginate separator only on top of the electrode, the pores in the electrode can first be filled with a sacrificial polymer, preferably of low molecular weight and/or non-water soluble, before depositing the alginate coating only on the top of the electrode. In an exemplary embodiment, a porous electrode is first filled with a sacrificial polymer which will prevent insertion of the alginate-containing composition into the electrode pores. This sacrificial polymer is then dissolved with a selective solvent that leaves the alginate separator coating intact on the top of the electrode. This sacrificial polymer can also be the pore-forming polymer in the alginate-containing coating mixture that creates the porous alginate-containing separator.

A porous alginate-containing separator coating on top of the anode can be created from an alginate water solution containing another polymer, such as polyethylene glycol (PEG), added to the alginate solution. The molecular weight of the PEG can be in the range from 2,000 to 1,000,000 Da. The ratio of alginate to PEG can range from 10:1 to 1:1. The alginate and PEG mixture is deposited onto a preformed anode via blade coating, spraying, roll coating, or other film-creating method. After coating drying PEG is selectively dissolved. Ethanol, methanol, acetone, THF and other solvents can be used for PEG dissolution.

A porous alginate-containing separator coating on top of the anode can be created from an alginate water solution containing polymeric nanoparticles applied to the anode to perform a separator function. To create the desired porosity of the separator coating, electrically isolative soluble particles are added to the alginate solution. Polystyrene latex (PS) with particle size 50 to 500 nm diameter is preferred. PS latex with a negative stabilizing group, such as sodium dodecyl sulfate, can be utilized. Preferable particle to alginate ratio ranges from 1:10 to 1:1. The separator slurry can be deposited via blade coating, spraying, roll coating and other film-creating methods. After slurry deposition and drying of the layer the PS particles are dissolved by treating the anode with a PS-dissolving solvent, such as methyl ethyl ketone (MEK). PS is soluble in MEK and will be removed from the coating forming porous film on top of the anode. The degree of porosity is tuned by varying the amount and size of the PS latex used in alginate-containing separator coating preparation.

A porous alginate-containing separator coating on top of the anode can be created from an alginate water solution containing inert particles, such as silica particles. The preferable size of the particles is 15 to 500 nm in diameter with particle-to-alginate ratio from 1:10 to 1:1. The separator slurry can be deposited via blade coating, spraying, roll coating, or other film-creating method.

In exemplary embodiments, a porous alginate-containing stand-alone separator having a thickness of less than 30 micron, porosity in the range from about 25 to about 85%, and composed of alginate can be prepared by several methods including but not limited to one of the following methods. (i) Electrospinning alginate solutions to form nonwoven mats composed of alginate-containing fibers or nanofibers. (ii) Casting a polymer film from a mixture composed of a water solution of alginate and other polymer or polymeric (nano)particles, followed by drying and a selective dissolution of the other polymer in a solvent that does not dissolve alginate. The polymer added to the alginate-containing film should be soluble in solvent other than water to provide selective dissolution of the polymer while not of the alginate. Examples of such polymers include but not limited to polyacrylic acid, polymethacrylic acid, polyethylene glycol, polyethelene imine, and polyallyl amine. (iii) Extruding an alginate-containing composition into alginate non-solvent bath, drying, annealing, and stretching to create the porosity and relaxation to reduce internal stresses. (iv) Extruding an alginate-containing composition, annealing, stretching to create the porosity and relaxation to reduce internal stresses. (v) Extruding an alginate-containing composition into alginate non-solvent bath, drying, annealing, and stretching to create the porosity and relaxation to reduce internal stresses. (vi) Mixing an alginate-containing solution with optional additives; extrusion of the heated solution into a sheet; extraction or evaporation of the solvent to form the porous structure. (vii) Preparation of alginate-containing fibers or/and nanofibers; continuously depositing them (or a combination of fibers and nanofibers) on a filter (metal mesh) in a way similar to the preparation of a paper and drying. (viii) Electrospinning of alginate solutions to form nonwoven mats composed of alginate-containing fibers or nanofibers onto the surface of the preformed anode (as collecting electrode for alginate electrospinning products).

It has been discovered that an alginate-containing composition can also be efficiently used as a binder and a filler in dense polymer-ceramic composite dielectric capacitors. A polymer for a polymer-ceramic composite material for use in dielectric capacitors should ideally provide good mechanical properties, possess high breakdown strength and strong bonding to the ceramic dielectric particles so that the breakdown does not occur at the interface between a ceramic and a polymer. Alginate forms very strong bonding to various ceramic particles and exhibits excellent mechanical properties. Alginate can also form strong bonding to a metal current collector, providing excellent mechanical integrity to the metal-dielectric layer-metal capacitor.

EXAMPLES

The various embodiments of the present invention are illustrated by the following non-limiting examples.

Materials and Methods

Materials.

Sodium alginate (sodium salt of alginic acid) was derived from Macrocystis pyrifera algae (also called Giant Kelp) and acquired from MP Biomedicals LLC, USA. Si nanopowder (NP—Si-L50, 98% purity, MTI Corporation, USA) and C additives (PureBlack® 205-110 and ABG1010, mixed in a 1:1 wt. ratio, all produced by Superior Graphite, USA) were used as active materials for the Si electrode preparation; graphite powder (Superior Graphite, USA) was used as an active material for graphite electrodes. The electrolyte used in electrochemical cells was composed of 1M LiPF6 salt in a mixture of carbonates (Novolyte Technologies, USA).

Characterization.

Ellipsometry studies on swelling of polymer films deposited on Si wafers in carbonates were performed using a COMPEL automatic ellipsometer (InOmTech Inc., USA) at an angle of incidence of 70° Si wafers from the same batch were used as reference samples. The thickness of the polymer binder was obtained by fitting the ellipsometric data, assuming the refractive index of the binder and carbonate to be 1.5. The mechanical properties of the polymer films (~2 micron) were measured with atomic force microscopy (AFM) by the tip indentation technique. Studies were performed using a Dimension 3100 (Digital Instruments Inc., USA) microscope. Force-distance data were collected using silicone cantilevers with spring constant of 40 N/m with approaching-retracting probing frequency of 1-2 Hz. Force-volume measurements were used to obtain the stiffness distribution over the surface of the sample. Measurements were performed on samples in both a dry state and a "wet" state after the film was immersed in a 1:1:1 mixture of dimethyl carbonate (DMC), ethylene carbonate (EC) and diethyl carbonate (DEC), similar to the electrolyte solvent used in the electrochemical tests. PVDF (Kureha, Japan) in a dry state was used as a reference and the stiffness data were normalized accordingly.

For NMR measurements sodium alginate was dissolved in $D_2O$ and freeze-dried twice to remove any exchangeable protons. Final concentration of the alginate for NMR measurements was 5 g/L. The 256 spectra were collected on Bruker Avance 500 NMR spectrometer at 80° C. and averaged. HOD signal in a spectrum was suppressed with WATERGATE pulse sequence. Fourier Transform Infrared (FTIR) spectroscopy measurements were performed using a Thermo-Nicolet (Thermo Electron Corporation, USA) Magna 550 FTIR spectrometer equipped with a Thermo-Nicolet Nic-Plan FTIR microscope. All samples were analyzed in the attenuated total reflectance (ATR) mode using a Diamond ATR accessory. For each spectrum 32 scans were collected at a resolution of 4 $cm^{-1}$ from 4000 $cm^{-1}$ to 500 $cm^{-1}$. Background spectra were collected in a similar way. All the FTIR data were analyzed using a OMNIC E.S.P version 6.1a software (Thermo Scientific, USA). X-ray photoelectron spectroscopy (XPS) measurements were performed using a Thermo K-Alpha XPS system (Thermo Scientific, USA) equipped with a Al Kα radiation as a source, with an energy resolution of 1 eV for the survey scans and 0.1 eV for high resolution scans of individual characteristic peaks. The X-ray gun produced a 400 μm spot size, and an electron flood gun was used to minimize charging. The system vacuum level was below 10-8 Torr during the data collection. An emission angle of 90° was used.

SEM studies of the nanopowder and electrodes were carried out using a LEO 1530 SEM microscope (LEO, Japan, now Nano Technology Systems Division of Carl Zeiss SMT, USA). The in-lens secondary electron detector was used for the studies, most of which were performed using an accelerating voltage of 5 kV and a working distance of 2-5 mm. XRD studies were performed using a PANalytical X'Pert PRO Alpha-1 diffraction system (PANalytical, Netherlands) equipped with an incident beam monochromator. The system used only the Kα1 component of Cu radiation, improving the overall quality of the collected powder diffraction data. An accelerating voltage of 45 kV, current of 40 mA, 2θ-step of 0.033° and a hold time of 79 sec was selected. The scan was collected between 20 and 80 degrees. X'Pert HighScore Plus software (PANalytical, Netherlands) was used for spectral analysis. The nitrogen adsorption and desorption isotherms were collected at 77 K in the range of relative pressures of 0.001-0.99 P/P0 using TriStar II 3020 (V1.03) surface area and porosity measurement system (Micromeritics Inc., USA) and used for measurements of the specific surface area (SSA) and pore size distribution (PSD) in the 2-100 nm range. After drying the powder under a vacuum at 80° C. for at least 12 h, 50-100 mg of each powder sample was degassed under a $N_2$ gas flow at 300° C. for at least 2 h prior to weighting and gas sorption measurements. For measuring electrode porosity, no high temperature (300° C.) was used. The SSAs were calculated using the Brunauer-Emmett-Teller method using Micromeritics DataMaster software. The relative pressure range of P/P0 from 0.05 to 0.3 was used for multi-point BET calculations. Ultra high purity gases (99.999%, Airgas, USA) were used for all experiments.

Electrochemistry.

Working electrodes were prepared by casting a slurry containing an active material (either Si nanopowder mixed with carbon additives or graphite) and a sodium alginate binder (15 wt. % for Si electrodes and 10 wt. % for graphite electrodes) on a 18 μm Cu foil (Fukuda, Japan). Working electrodes consisting of active materials (either Si nanopowder mixed with carbon additives or graphite) and PVDF (9305, Kureha, Japan, 10 wt. % for graphite electrodes and 15 wt. % for Si electrodes) were used for the purpose of comparison. The active material in the Si electrodes contained 75 wt. % Si and 25 wt. % C. The electrodes were calendared and degassed in vacuum at 105° C. for at least 4 hours inside an Ar-filled glove box (<1 ppm. of oxygen and water, Innovative Technology, Inc., USA) and were not exposed to air prior to their assembly into cells.

Example #1: Assessment of Binder Performance Under Extreme Conditions

Figure 2A:
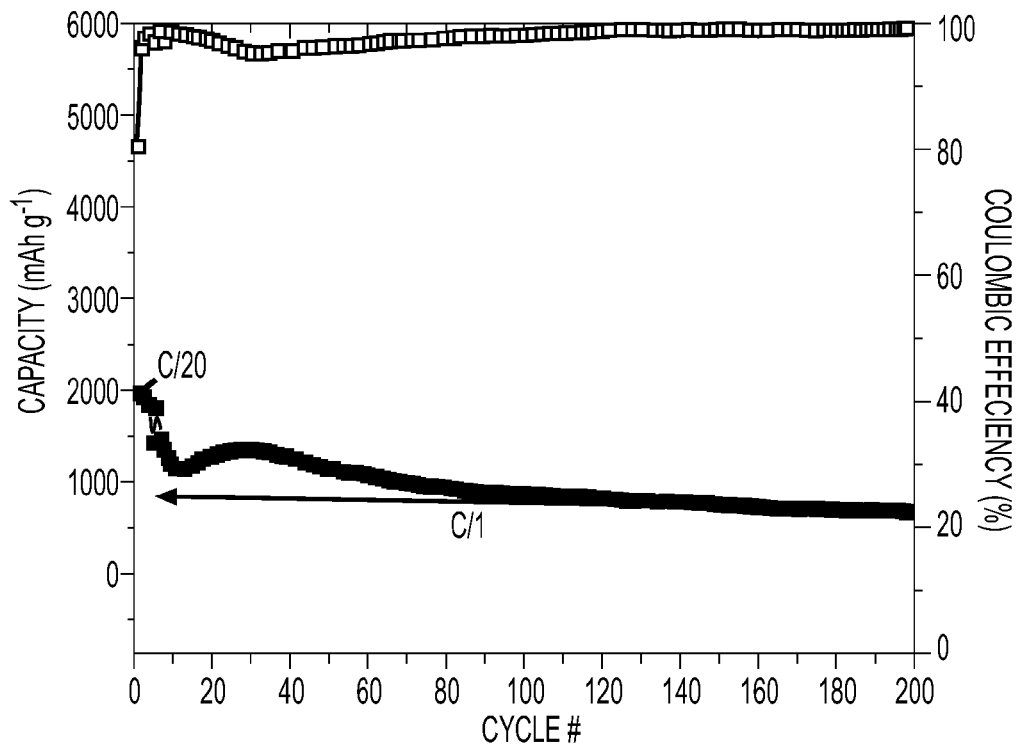
FIGS. 2A-B graphically illustrate electrochemical performance characteristics of a silicon anode including an alginate-containing binder.
Figure 2B:
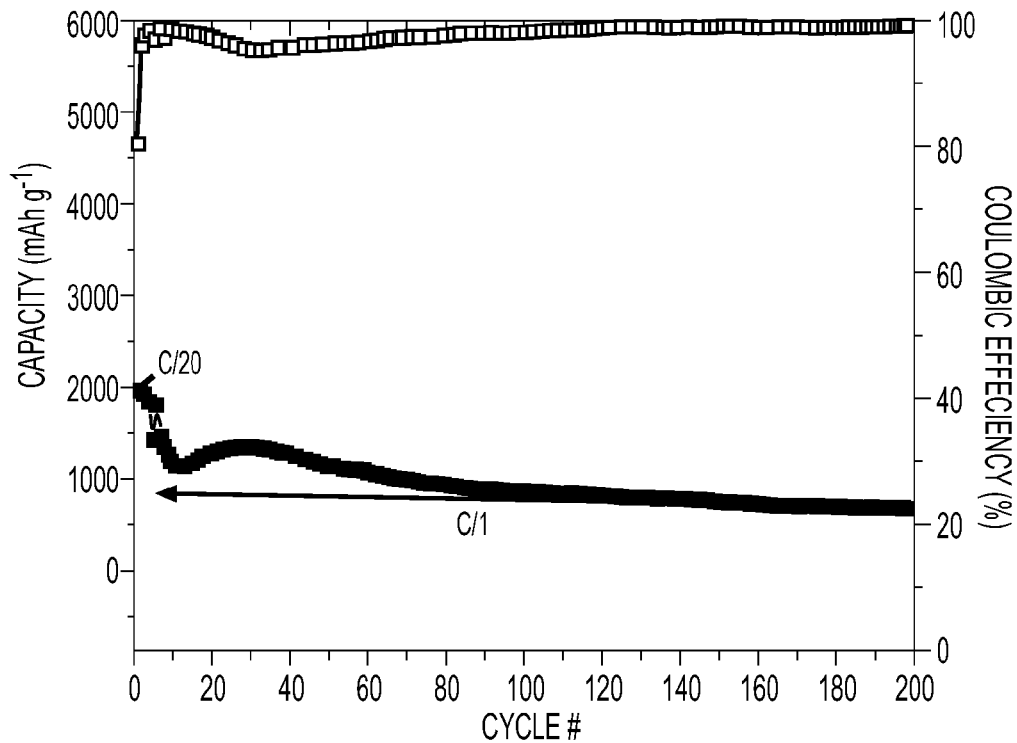
Figure 3:
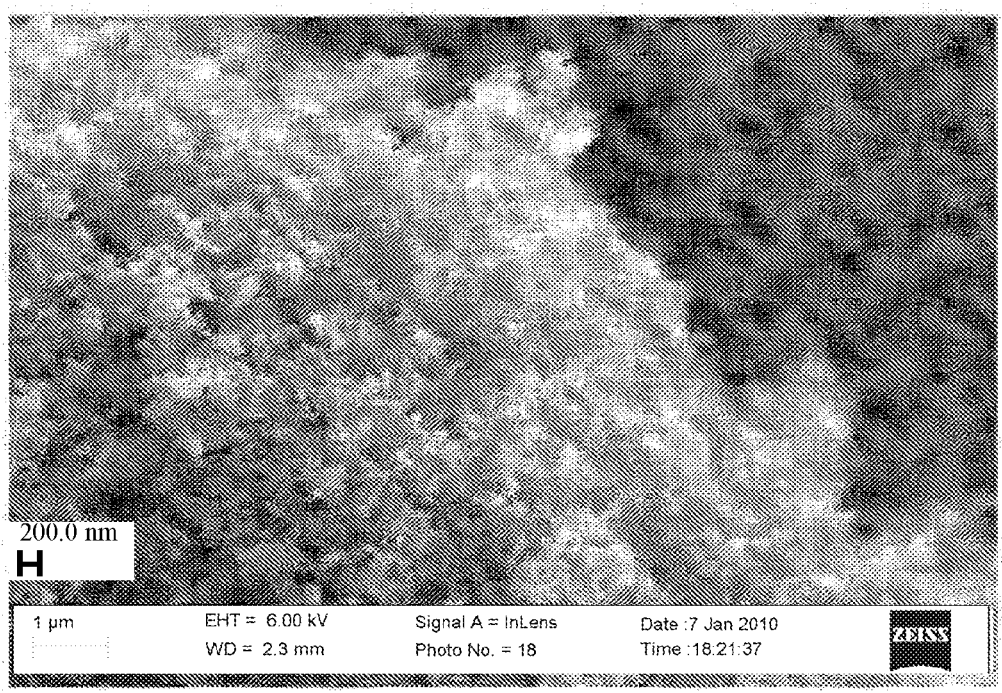
FIG. 3 provides a scanning electron microscopy (SEM) image of silicon nanopowder.
Figure 4A:
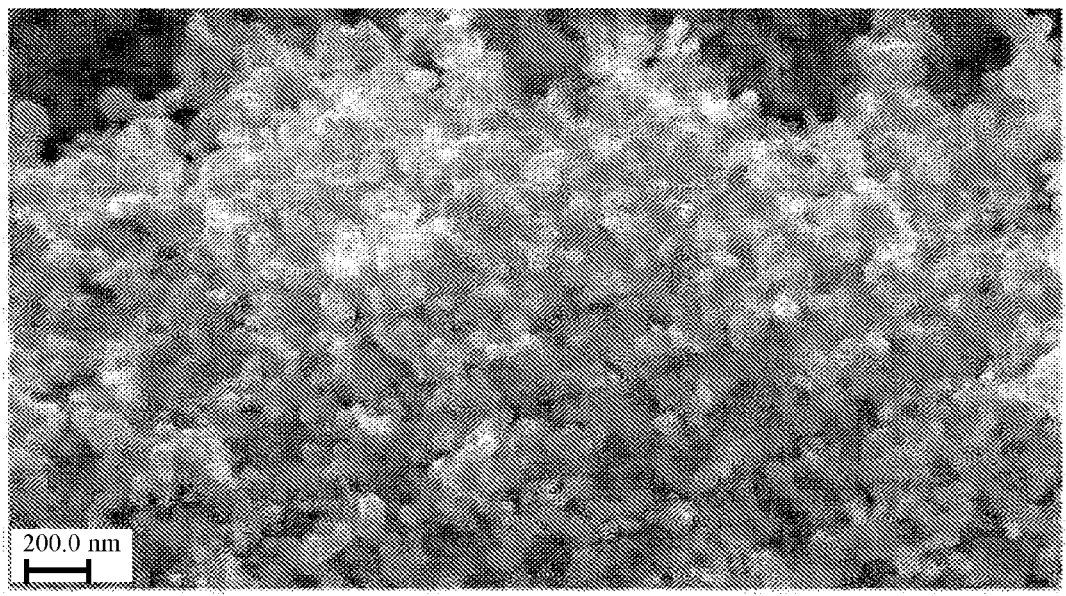
FIGS. 4A-B provide SEM images of silicon nanopowder.
Figure 4B:
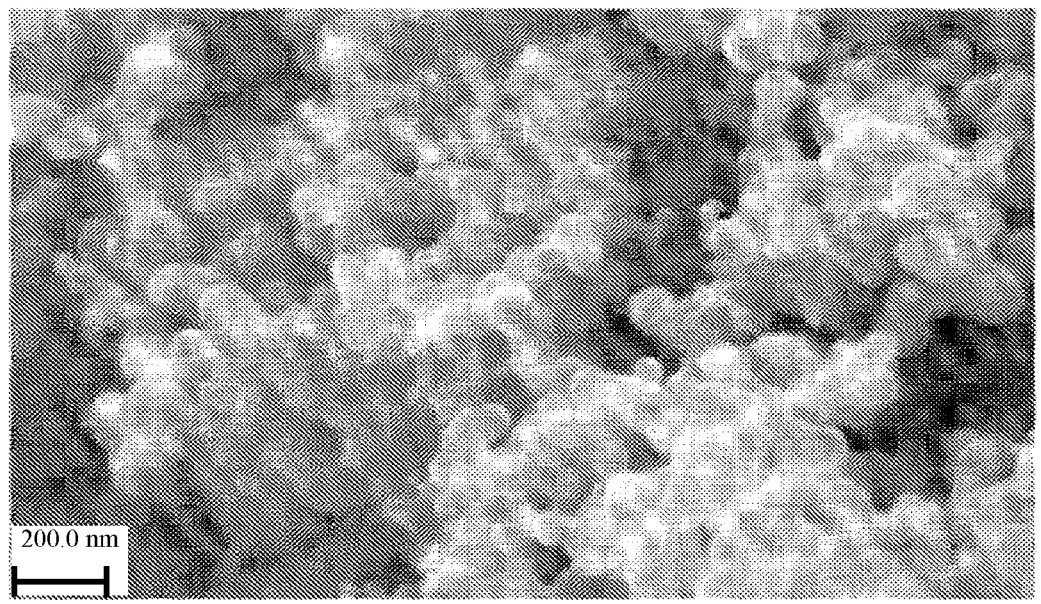

To assess binder performance under extreme conditions, charge-discharge cycling to nearly 100% depth-of-discharge (DoD) (to 0.01 mV vs. L/Li+) were performed without limiting the intercalation capacity. In contrast to studies on CMC binders, which often requires low Si (33 weight percent (wt. %)) and high binder and carbon additive (33 wt. %/each) content, a high ratio of Si to C (Si:C=3:1) and a considerably smaller amount of binder (15 wt. %) were used for our tests. Alginate was used as a binder in the experiments. The electrode slurries (water with a small addition of (about 10 wt. %) alcohol was used as a solvent) were thoroughly mixed using an ultrasonic bath and a laboratory stirrer at 600 rotations per minute (rpm) for at least 1 hour, cast on an 18 micrometer (μm) Cu foil (Fukuda, Japan) using a 150 μm doctorblade, dried in air first at room temperature and then at 60 degrees Celsius (° C.) for at least 4 hours, degassed in vacuum at 100° C. for at least 2 hours inside an Ar-filled glove box (<1 parts per million (ppm) of oxygen and water, Innovative Technology, Inc., USA) and were not exposed to air prior to their assembly into the cells. The commercial electrolyte was composed of 1M $LiPF_6$ salt in ethylene carbonate-diethyl carbonate-dimethyl carbonate mixture (EC:DEC:DMC=1:1:1 vol %) (Novolyte Technologies, USA) with 5 wt. % addition of vinylene carbonate. Lithium metal foil (0.9 mm thick, Alfa Aesar, USA) was used as a counter electrode. 2016 stainless steel coin cells were used for electrochemical measurements. The Cu current collector of the working electrode was spot-welded to the coin cell for improved electrical contact. Charge and discharge rates were calculated assuming the experimentally determined capacity for C and the maximum theoretical capacity for Si (4200 mAh/g), given the composition of the active material (either C or CSi mixture). Long-term cycling was performed in the 0.01-1 V vs. Li/Li+. Coulombic efficiency was calculated as 100% ($C^{dealloy}/C^{alloy}$), where $C^{dealloy}$ and $C^{alloy}$ are the capacity of the anodes for Li insertion and extraction. Arbin SB2000 (Arbin Instruments, USA), a multichannel potentiostat, was used for electrochemical measurements. For the purpose of illustrating the invention, there are shown and presented exemplary embodiments of the invention; however, the invention is not limited to the specific methods, compositions, electrode fabrication and devices disclosed. FIGS. 2A and 2B show the electrochemical performance characteristics of the anode containing alginate. FIGS. 3, 4A, and 4B depict the scanning electron microscopy (SEM) image of the Si nanopowder used in some of the investigated samples, such as those presented in FIGS. 4A and 4B.

Si-based anodes prepared with the addition of alginate, as illustrated in FIGS. 4A and 4B demonstrated high capacity (near 3000 mAh/g at the first two cycles collected at slow (C/2) charge-discharge rate), very high stability when tested at C/1 rate, and Coulombic efficiency approaching 100% with increasing cycle number.

The Si nanopowder had an average size below about 100 nanometers (nm). However, Si powder having different size distribution also yields good performance. Similarly, other anode materials are also expected to show superior performance if used with alginate as a binder or additive.

Example #2: Comparison of Na Alginate and PVDF Binders

Figure 5:
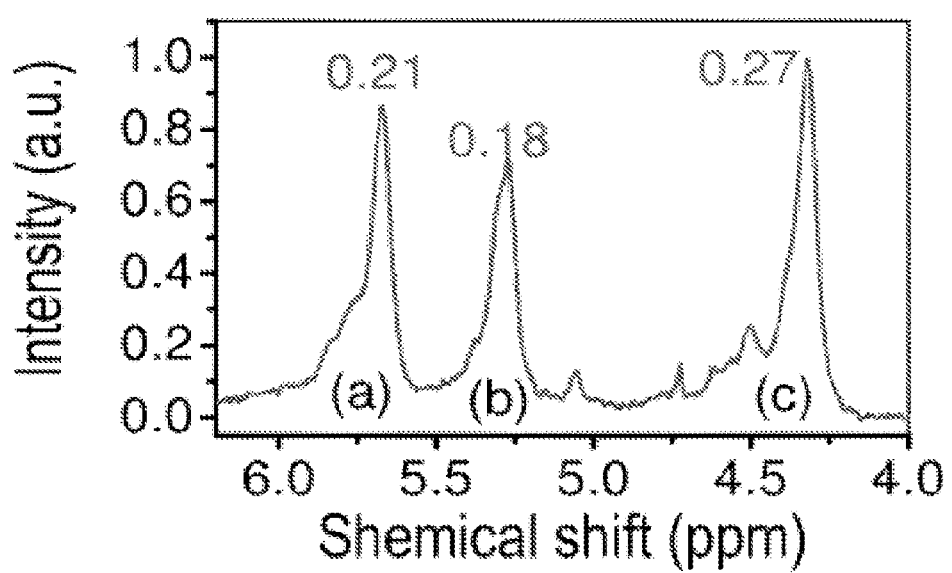
FIG. 5 provides $^1$H nuclear magnetic resonance (NMR) data of a Na alginate sample.
Figure 6:
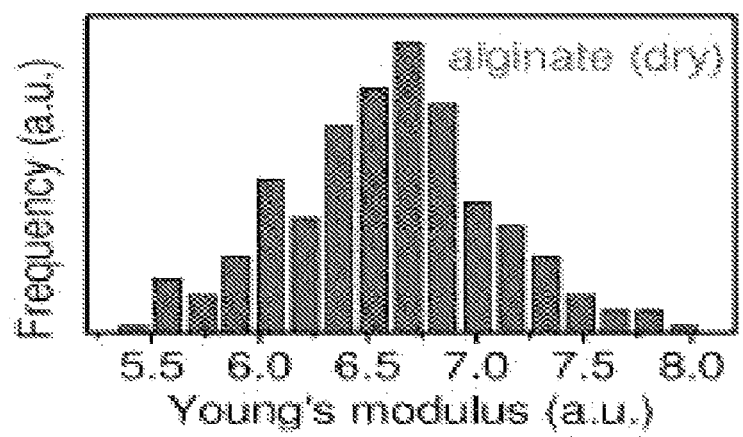
FIGS. 6-9 provide atomic microscopy (AFM) data comparing Young's modulus of Na alginate and PVDF binders in both dry and wet states.
Figure 7:
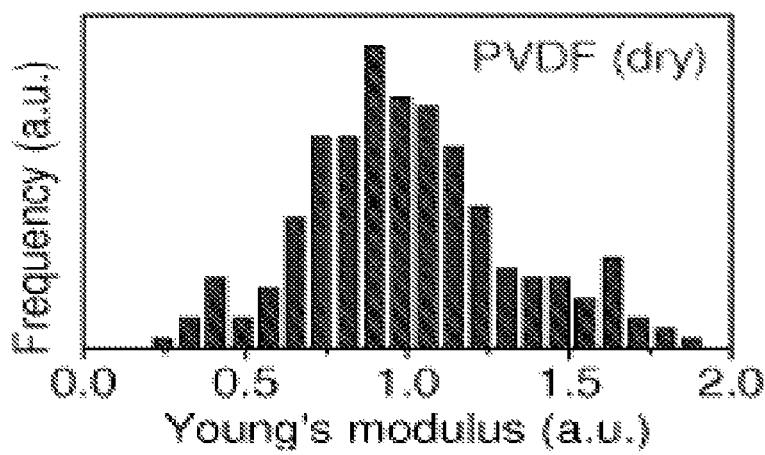
Figure 8:
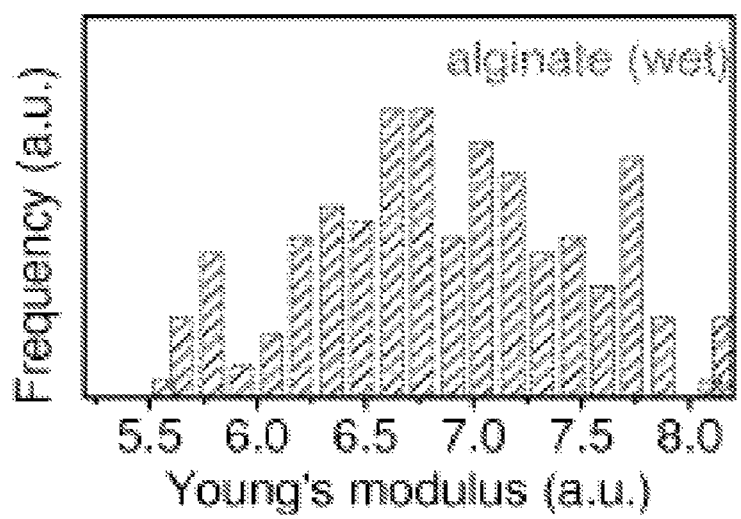
Figure 9:
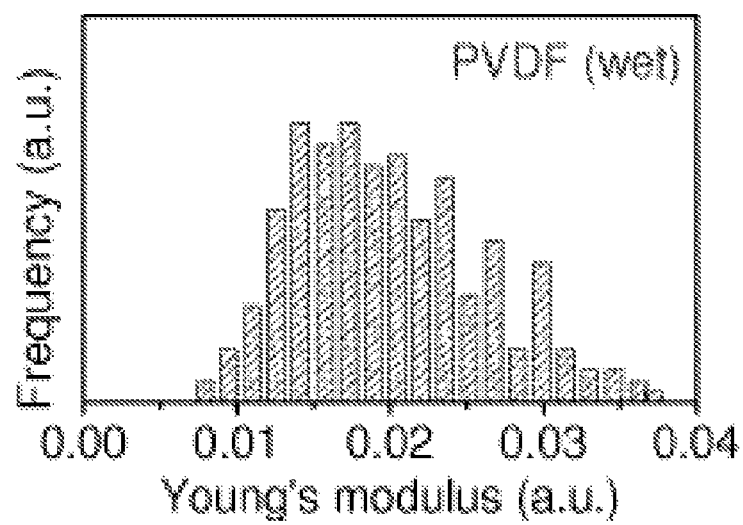
Figure 23A:
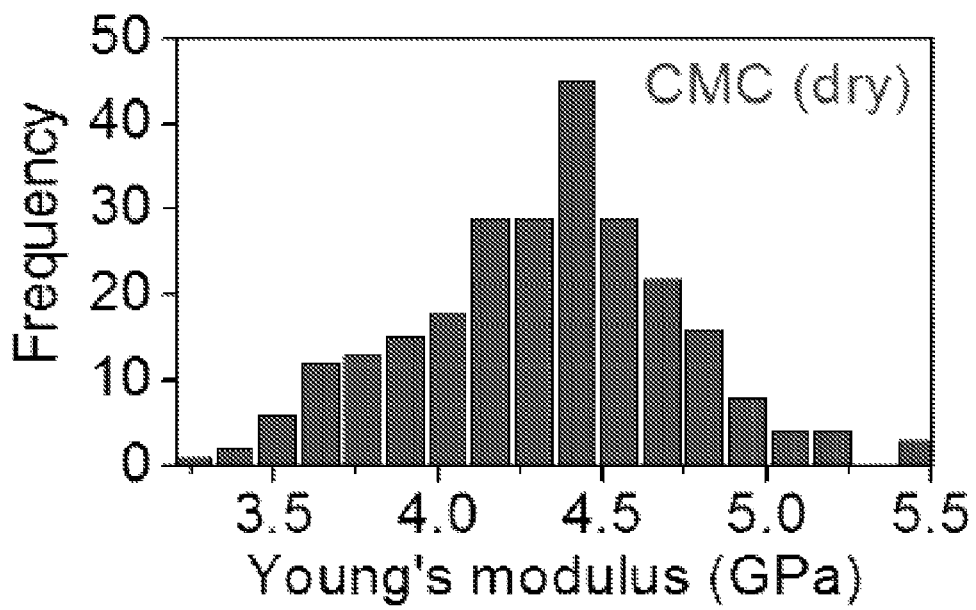
FIG. 23A depicts the Young's modulus of Na-CMC in a dry state.
Figure 23B:
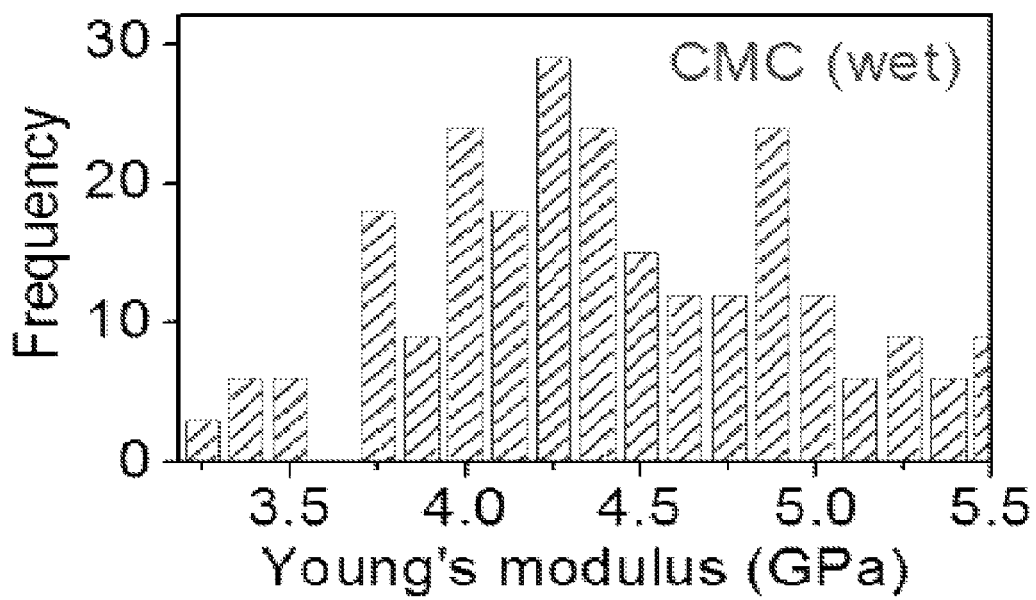
FIG. 23B depicts the Young's modulus of Na-CMC in a wet (impregnated with electrolyte solvent) state.
Figure 24A:
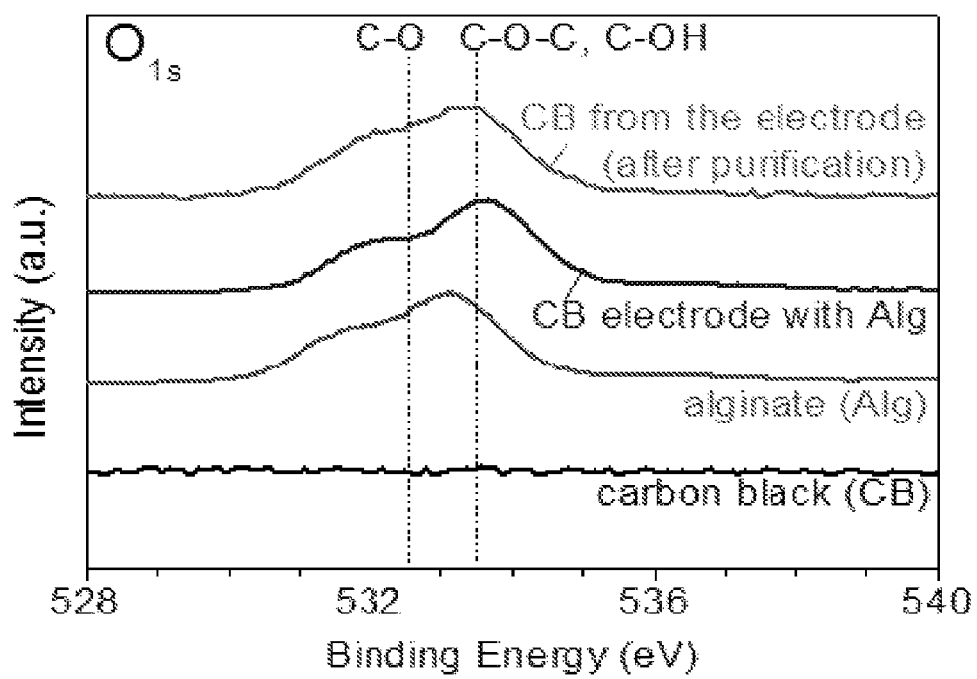
FIG. 24 A depicts the XPS characterization ($O_{1s}$ high resolution spectra) of alginate, carbon black (CB), CB electrode prepared by mixing carbon additives with Na alginate binder, and CB powder extracted from the CB electrode after extensive purification.
FIG. 24B depicts the XPS characterization ($C_{1s}$ high resolution spectra) of alginate, carbon black (CB), CB electrode prepared by mixing carbon additives with Na alginate binder, and CB powder extracted from the CB electrode after extensive purification.
FIG. 24C depicts the XPS characterization ($O_{1s}$ high resolution spectra) of purified exfoliated graphite (PEG), alginate, PEG electrode prepared by mixing PEG with Na alginate binder, and PEG powder extracted from the PEG electrode after extensive purification.
FIG. 24D depicts the XPS characterization ($C_{1s}$ high resolution spectra) of PEG powder, alginate, PEG electrode, and PEG powder extracted from the PEG electrode after extensive purification.
Figure 24B:
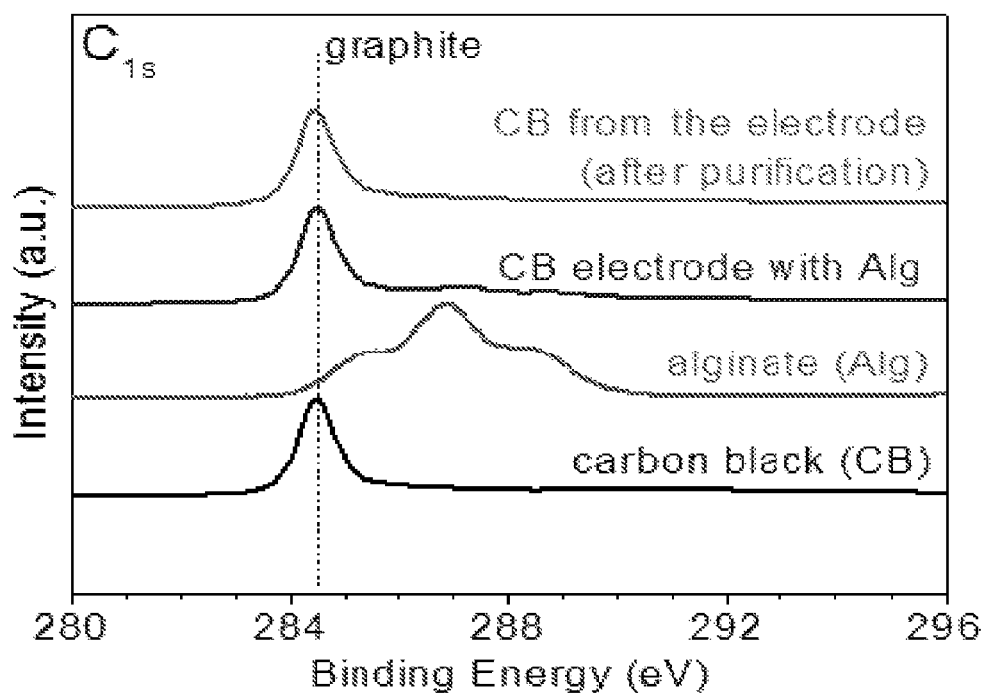
Figure 24C:
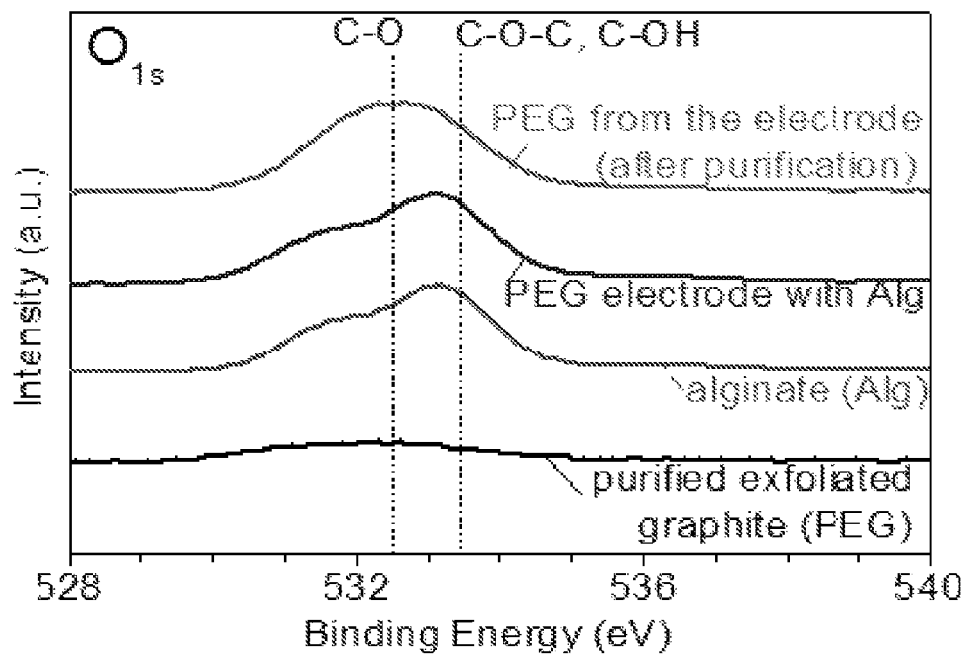
Figure 24D:
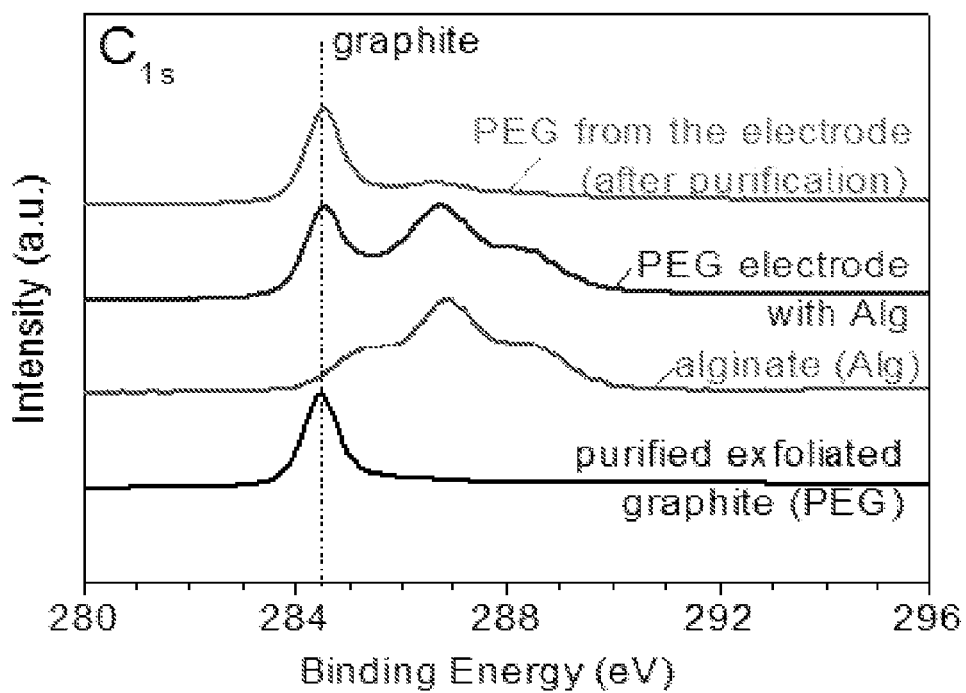

The ratio of M-to-G monoblocks in alginates may range from 0.3 to 9, with a typical value in commercial samples being ~1. Nuclear Magnetic Resonance (NMR) spectroscopy measurements, illustrated in FIG. 5, reveal that the ratio of M-to-G monoblocks in the Na alginate sample used for the studies, described below, was 1.13. This ratio was calculated based on integration of the peaks at 4.7, 5.3 and 5.7 ppm. Atomic force microscopy (AFM) studies showed that in dry state films made of the Na alginate exhibit approximately 6.7 times higher stiffness than dry films of PVDF, shown in FIGS. 6 and 7. Interestingly, when immersed into an electrolyte solvent the stiffness of alginate did not change significantly, shown in FIG. 8, while the PVDF films became nearly fifty times softer, shown in FIG. 9. Further, ellipsometry studies show no detectable swelling of thin (~70 nm) Na-alginate films in the electrolyte solvent vapors. In contrast, PVDF films of similar thickness attract significant amounts of carbonates from the vapor, demonstrating changes in thicknesses of approximately 20%. The negligibly small swellability of the alginate indicates a low level of polymer/electrolyte interaction. This property may prevent undesirable access of the electrolyte liquid to the binder/Si interface. The similar behavior of Na-CMC binders likely explains their promising performance with Si anodes as well. FIG. 23 A depicts the Young's modulus of Na-CMC in a dry state. FIG. 23B depicts the Young's modulus of Na-CMC in a wet (impregnated with electrolyte solvent) state.

Example #3: Silicon Nanoparticle Characteristics

Figure 10:
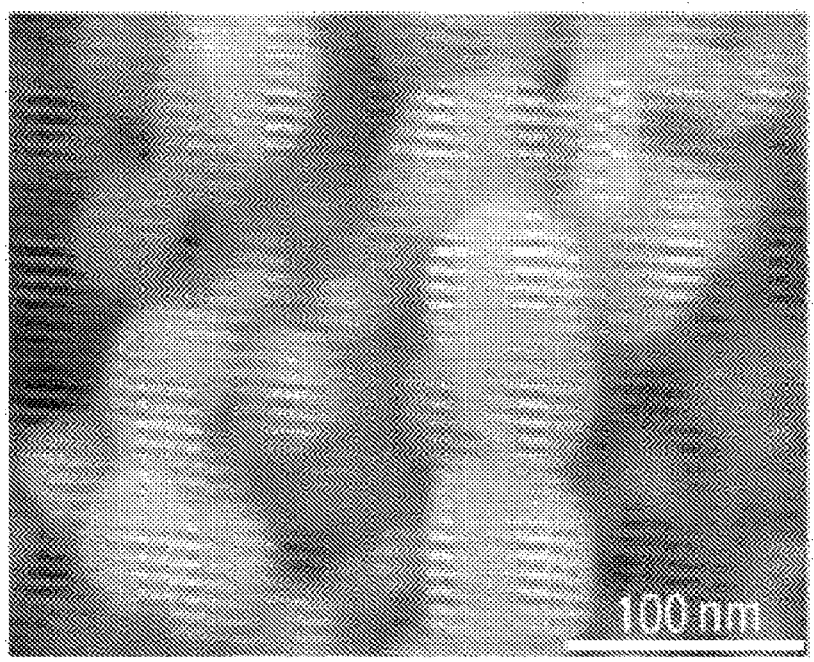
FIG. 10 provides SEM images of silicon nanoparticles.
Figure 11:
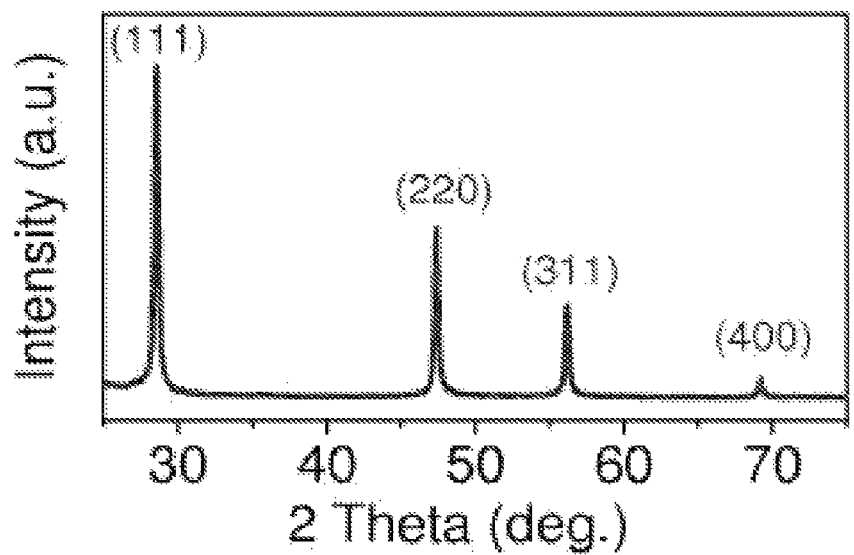
FIG. 11 provides energy dispersive spectroscopy (EDS) and X-ray diffraction data (XRD) of silicon nanoparticles.
Figure 12:
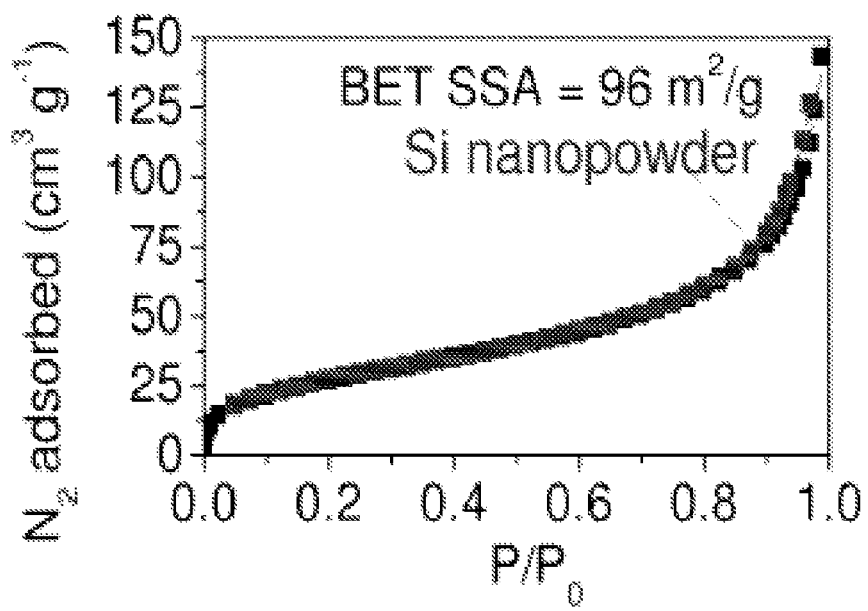
FIG. 12 provides $N_2$ sorption isotherm data collected on silicon nanopowder at 77 K.
Figure 13:
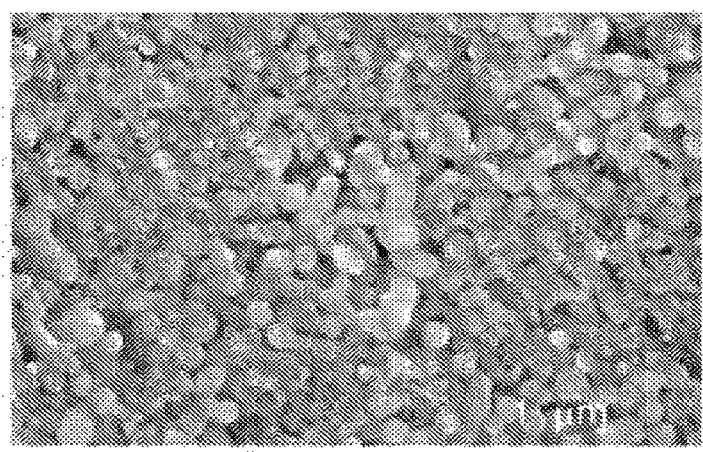
FIG. 13 provides an SEM image of silicon nanopowder bonded with a Na alginate binder and forming an electrode.

Scanning electron microscopy (SEM) studies show the majority of Si nanoparticles used in our studies to be of elliptical or spherical shape with diameter in the range of 20 to 100 nm, as illustrated in FIG. 10. Energy dispersive spectroscopy and X-ray diffraction, illustrated in FIG. 11, studies have reveal no impurities in the nanopowder. The average Si particle size was calculated from the XRD data to be approximately 37 nm. The shape of the $N_2$ adsorption/desorption isotherms collected on the Si nanopowder (Type II according to the Brunauer classification) is typical for macroporous (>50 nm) solids with unrestricted multilayer adsorption, shown in FIG. 12. The specific surface area (SSA) of the Si nanopowder calculated using the Brunauer-Emmett-Teller (BET) equation is 96 $m^2/g$, which is much higher than 0.5-10 $m^2/g$ found in graphites used in Li-ion batteries. Assuming the density of Si nanoparticles to be 2.3 $g/cm^3$, the average Si particle size can be calculated to be approximately 27 nm, which is close to what we observed in SEM and estimated using XRD measurements. The electrodes prepared using Si nanopowder, conductive C additives and Na-alginate show a uniform structure and a very smooth surface, illustrated in FIG. 13, with small (<100 nm) pores visible between the nanoparticles. The estimated electrode density is about 0.50 $g/cm^3$. Assuming the theoretical density of graphite, Si and alginate to be accurate, one can estimate the remaining pore volume of the electrode to be approximately 5 times the volume of Si particles. In recent studies on electrochemical alloying of Si in a nanoconfined pore space, the nano Si may undergo the irreversible shape changes upon the initial Li insertion, adapting to the restricted shape of the rigid pore. In subsequent cycles, however, the Si—Li alloy may exhibit fully reversible shape changes. Therefore, even if the rigidity of the alginate binder would prevent electrode expansion upon the first Li insertion, the initial electrode porosity could provide space to accommodate the volume changes in Si during cycling.

Example #4: Interactions of Na-Alginate with Si and C Particles

Figure 14:
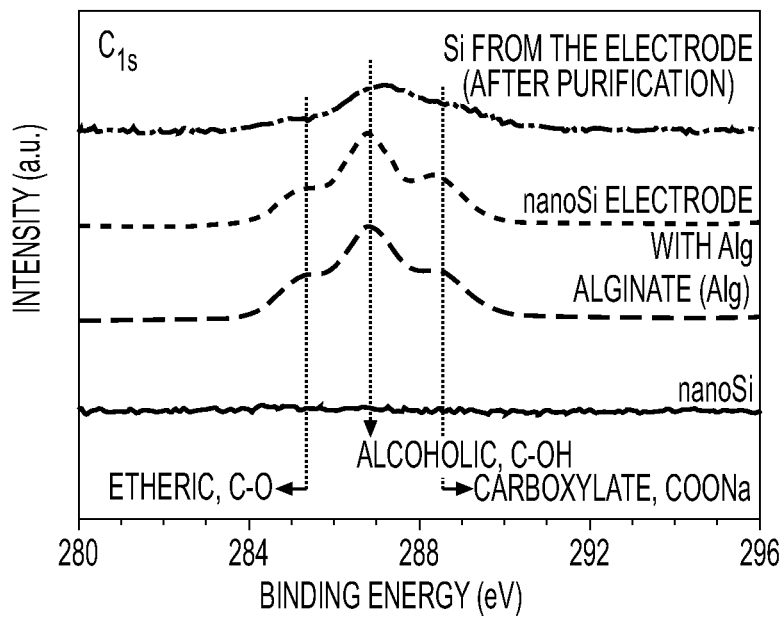
FIGS. 14 and 15 provide X-ray photoelectron spectroscopy (XPS) data of the initially used silicon powder, Na alginate, silicon-Na (Si—Na) alginate, and silicon obtained from the silicon-Na alginate electrode after dissolution and multiple washing steps.

In order to evaluate the interactions of Na-alginate with Si and C particles electrodes consisting of pure Si/alginate and pure C/alginate mixtures were prepared. After drying the electrodes in vacuum (0.01 Torr) at 105° C. for 4 hours, pieces of the electrodes were immersed in large beakers filled with de-ionized (DI) water (alginate solvent) and stirred for 4 hours. After filtering and drying in air, the Si (or C) particles were collected, immersed in DI water, stirred for 4 hours and filtered. This procedure was repeated 5 times. Prior to spectroscopy measurements, all samples were dried in vacuum at 105° C. for at least 8 hours. The $C_{1s}$ core-level x-ray photoelectron spectroscopy (XPS) spectra of the alginate and Si-alginate films show three characteristic peaks corresponding to ether, alcoholic and carboxylate functional groups, shown in FIG. 14. As expected, the initial Si powder does not show any signs of C atoms on the surface. Interestingly, in spite of the extensive purification of the Si powder after mixing with alginate, the powder undoubtedly retains significant content of alginate residues on the surface. A comparison of the $C_{1s}$ spectra of DI water-cleaned Si nanopowder before and after mixing with Na-alginate suggests formation of strong hydrogen bonding between the hydroxylated Si surface and alginate carboxylic moieties. Somewhat similar conclusions could be made by analyzing the $Si_{2p}$ core-level peaks.

Figure 15:
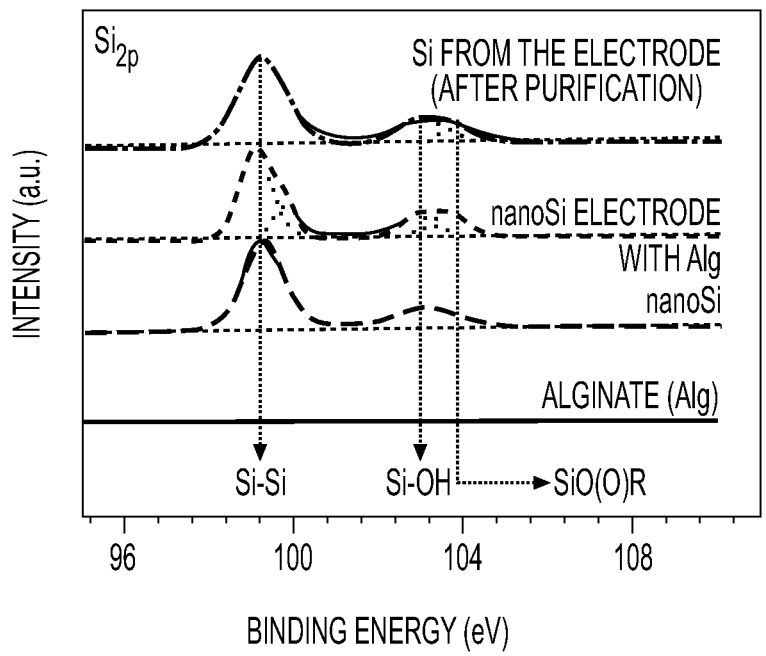

Prior to mixing with alginate, the Si nanopowder surface shows a strong bulk Si peak at approximately 99.2 eV and a peak corresponding to hydroxyl functional groups at approximately 103 eV, shown in FIG. 15. However, an additional peak corresponding to R(O)—O—Si at 103.9 eV is observed after mixing Si with Na-alginate and vacuum annealing to form an electrode. This peak is mostly retained after the extensive cleaning of the Si nanopowder described above. Analogous XPS experiments with C additives suggest rather similar interactions between the polar groups and defects on the carbon surface and alginate moieties.

Figure 16:
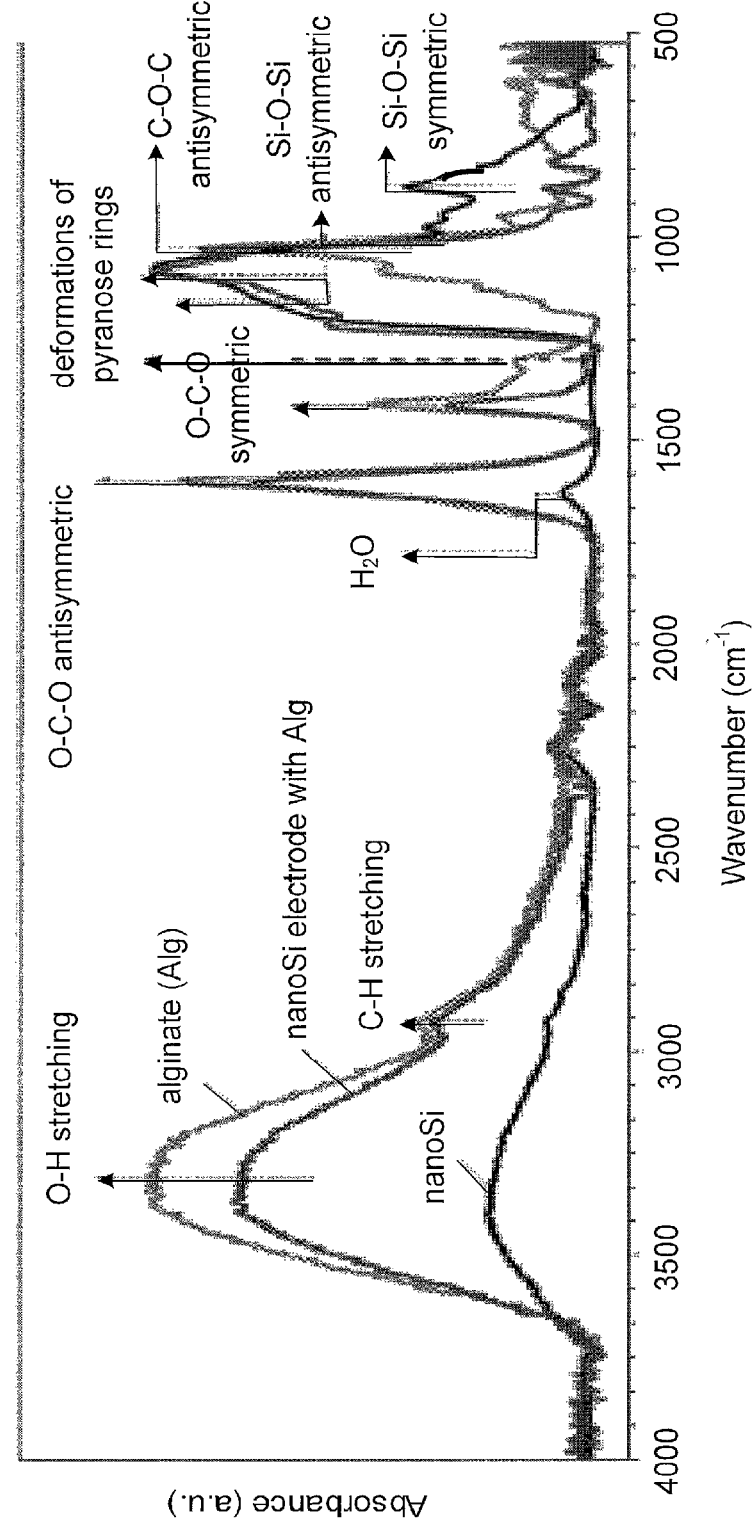
FIG. 16 provides Fourier transform infrared (FTIR) spectroscopy data of Na-alginate, the Si—Na alginate electrode, and the Si powder (used for the electrode formulation)

Fourier transform infrared (FTIR) spectroscopy studies provide further support for the strong bonding between the alginate and Si powder. A Na-alginate film exhibits a broad absorption band at about 3320 $cm^{-1}$ related to hydrogen bonded O—H stretching vibrations, a peak at about 1598 $cm^{-1}$ corresponding to O—C—O (carboxylate) asymmetric vibrations, a peak at about 1410 $cm^{-1}$ corresponding to O—C—O symmetric vibrations, a peak at about 1300 $cm^{-1}$ related to the C—C—H and O—C—H deformation of pyranose rings, and a peak at about 1028 $cm^{-1}$ related to C—O—C asymmetric vibrations, among others, shown in FIG. 16. After electrode formation the relative intensity of the 1300 $cm^{-1}$ peak related to pyranose ring deformation vibrations decreases significantly when compared to pure Na-alginate. This decrease provides another evidence of a chemical interaction between the alginate and Si nanoparticles. The strong interactions between the binder and the Si surface have been previously identified as one of the most critical factors affecting the stability of Si-based electrodes.

Coin cells with metallic Li counter electrode were employed to evaluate the electrochemical performance of all of the electrodes. Since an assessment of the binder performance under extreme conditions was of interest, charge-discharge cycling to nearly 100% depth-of-discharge (DoD) (to 0.01 mV vs. L/Li+) were performed without limiting the intercalation capacity. In contrast to prior studies on CMC binders, which often required low Si (33 wt. %) and high binder and carbon additive (33 wt. %/each) content, a high ratio of Si to C (Si:C=3:1) and considerably smaller amount of binder (15 wt. %) were used for testing.

Figure 25:
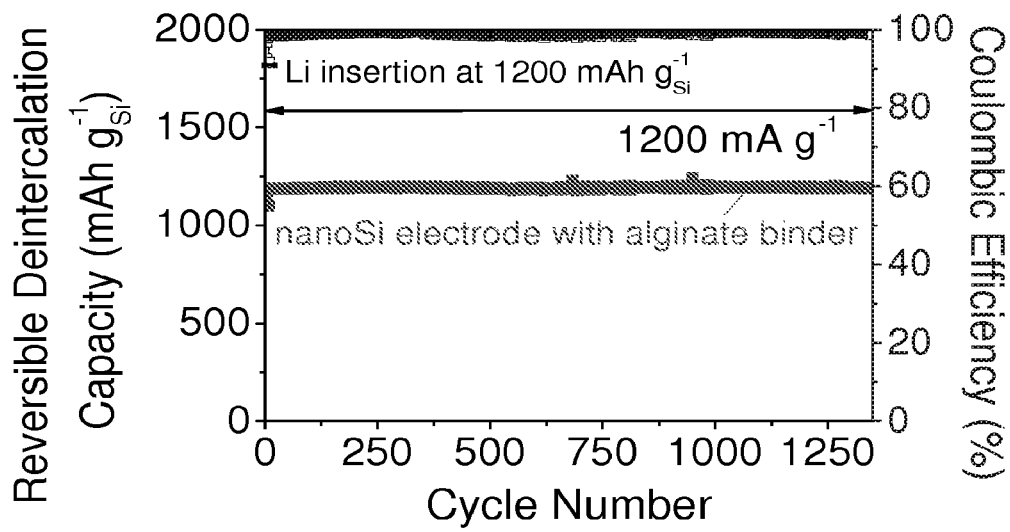
FIG. 25 depicts the electrochemical performance of alginate-based nanoSi electrodes (electrode density=0.50 g cm-3, weight ratio of Si:C=3:1).
Figure 26:
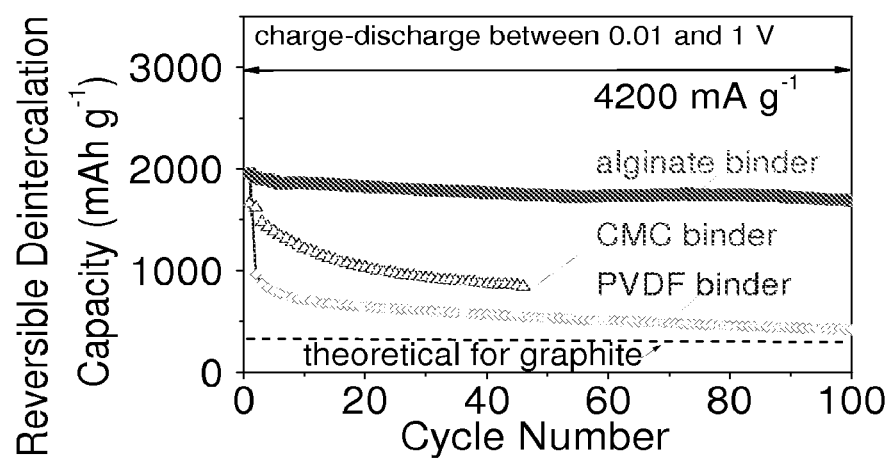
FIG. 26 depicts the electrochemical performance of a Si anode with PVDF and Na-CMC.

Charge-discharge cycling performed with Li insertion capacity limited to 1200 mAh per gram of Si showed stable anode performance for over 1300 cycles (FIG. 25). In real-life applications, however, a noticeable variation in the degree of lithiation of individual Si particles may take place. Therefore, it is important to test the ability of Si anodes and Si-binder interface to withstand the largest volume changes taking place during full lithiation. In our additional tests (FIGS. 17, 21, and 24B-D, 25) we inserted Li to nearly 100% depth-of-discharge (DoD)- to 0.01 mV vs. L/Li$^+$ and additionally held the anode at this potential for over 10 min. Since the average time of full Li insertion into 100 nm diameter Si nanoparticles is 6 minutes and average Si particles in our electrode are only 27 nm, this procedure warranted that a large portion of the Si particles (close to a Cu foil) was fully lithiated. In spite of the severe testing conditions an alginate binder allowed for a stable performance of Si electrodes (FIGS. 17, 21, 24B, 25). This is in contrast to Si anodes with PVDF and Na-CMC, which demonstrated poor stability (FIG. 26).

Figure 17:
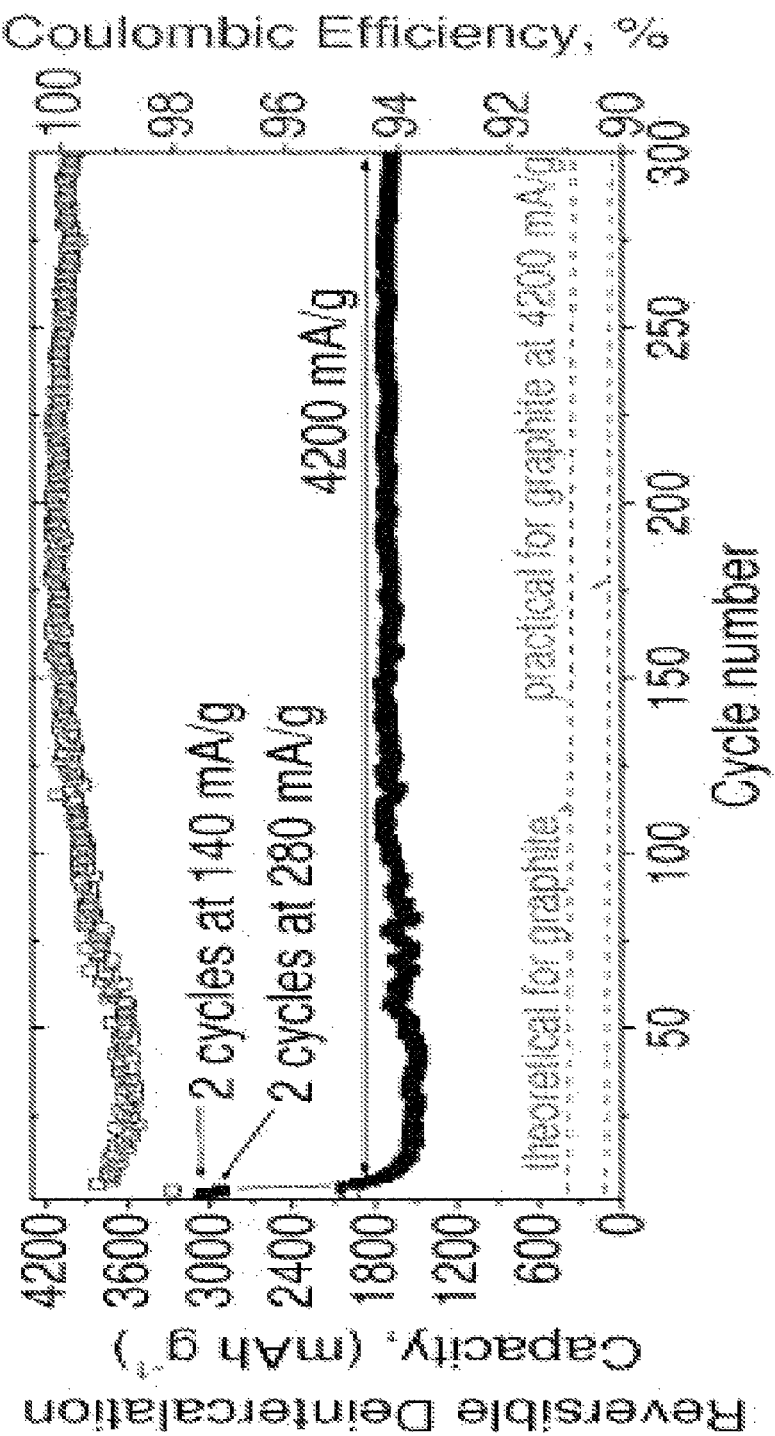
FIG. 17 graphically illustrates reversible deintercalation specific capacity of a silicon anode comprising 15 wt. % Na alginate, 64 wt. % Si nanoparticles, and 21 wt. % C particles (C conductive additives) normalized by the weight of Si and C combined.

The reversible deintercalation (Li-extraction) specific capacity of the Si anode reached 3040 mAh/g at a current density of 140 mA/g, shown in FIG. 17, which is over eight times higher than the theoretical specific capacity of graphite (372 mAh/g). The contribution of Si nanopowder alone could be calculated as about 4000 mAh/g, which is consistent with observations on other nanoSi materials, but is noticeably higher than what was previously observed for microSi. The contribution of the C additives used in our electrodes was estimated about 160 mAh/g (40 mAh/0.25 g). The volumetric anode capacity was determined to be about 1520 mAh/cm$^3$ at 140 mA/g current density, which is 2.5 times higher than about 620 mAh/cm$^3$ for graphitic anodes. At a slightly higher current density of 280 mA/g, the anode capacity remains high at 2910 mAh/g, but once the current density is significantly increased to 4200 mA/g the capacity decreases and equilibrates at 1700 mAh/g. This reduced capacity is still about 4.5 times higher than the theoretical capacity of graphite and is about 9-to-20 times higher than the experimentally determined capacity of graphites (85-190 mAh/g) at such a high current density. In spite of the very severe testing conditions, the electrode demonstrated stable performance for over 300 cycles. The combination of an ultra-high reversible specific capacity and the demonstrated long-term stability achieved in comparable electrochemical tests is unprecedented not only for Si particles but also for any other competitive technologies. FIG. 25 depicts the electrochemical performance of the alginate-based nanoSi electrodes (electrode density=0.50 g cm-3, weight ratio of Si:C=3:1). Specifically, in FIG. 25 reversible Li deintercalation capacity and coulombic efficiency of the nanoSi electrodes with an alginate binder vs. cycle number for Li insertion level fixed to 1200 mAh gSi$^{-1}$ is shown.

A stable binder for Si anodes needs to posses several critical properties. First, a very weak binder-electrolyte interaction is needed for the long-term anode stability. Indeed, binders that provide at least satisfactory performance in Si anodes (including CMC and PAA) experience virtually no swelling in commonly used electrolytes. Once a solvent reaches the Si electrode surface by permeating through a binder layer, it decomposes. The solvent decomposition products deposited in the region between the binder and the Si would significantly weaken the Si-binder bond strength. Therefore, little-to-no interactions between the binder and the solvent are critically needed to prevent access of the solvent molecules to the Si-binder boundary.

Another critical property of an ideal Si binder is to allow the access of Li ions to the Si surface. Therefore, if a binder (such as alginate, CMC, PAA and others) is not permeable to solvent molecules, it should either cover only a portion of the Si surface or remain permeable to Li ions. Due to the small size of Si nanopowder and its resultant high surface curvature, the number of anchor points between a binder polymeric chains and Si particles is limited, suggesting that a portion of the Si surface should indeed be directly exposed to the electrolyte. XPS studies on alginate-coated Si particles indeed show that a portion of Si surface is alginate-free. To identify the conductivity Li-ions through Na-alginate a thin (1 μm) layer was deposited on Cu foil and performed cyclic voltammetry and electrochemical impedance spectroscopy tests with Li foil as a counter electrode. Both tests revealed small, but sufficient ionic conductance. From the impedance data the Warburg constant was determined and the diffusion coefficient of Li in Na-alginate was estimated to be about $10^{-8}$ S·cm$^{-1}$. While this is four orders of magnitude smaller than the diffusion coefficient of Li in solid electrolytes, the nm-level thickness of a Na-alginate layer compensates for its limited diffusivity. The proposed mechanism of ion transport through the alginate is via hopping of Li ions between the adjacent carboxylic cites, similarly to alginate's function for the ion transport in the algae cells.

Figure 18A:
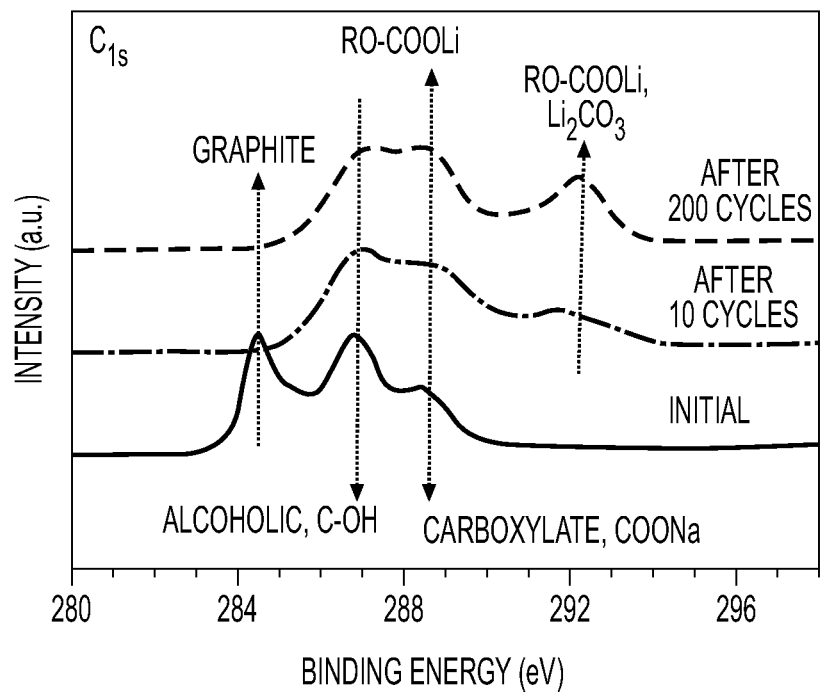
FIGS. 18A-C provide XPS data of electrodes before and after cycling in Li half cells within the potential range from 0.01 to 1 V vs. Li/Li$^+$.
Figure 18B:
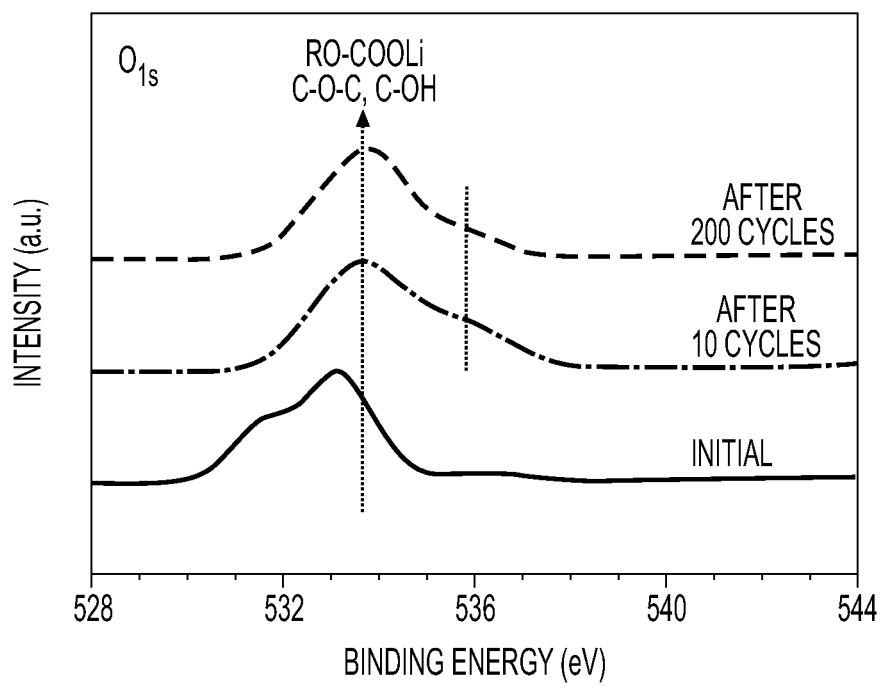
Figure 18C:
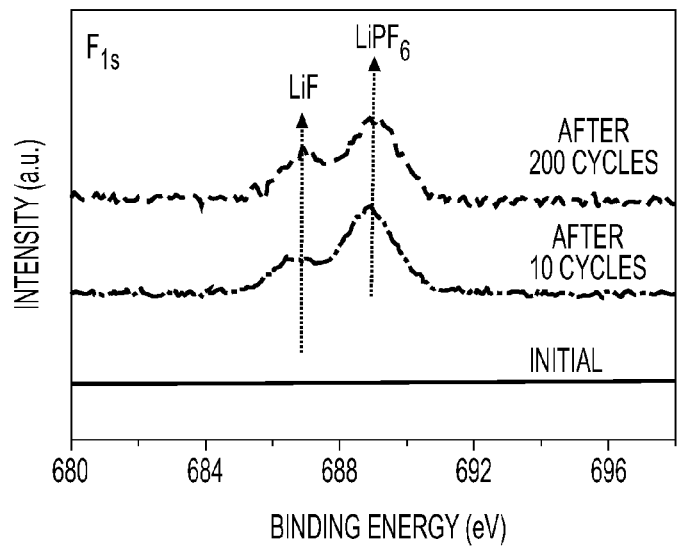

Third, an ideal binder should assist in building a deformable and stable solid-electrolyte interphase (SEI) on the Si surface. High Coulombic Efficiency (CE) is important for practical applications and is challenging to achieve in Si-based anodes due to the need to maintain a stable SEI layer, in spite of the large changes in particle volume (and therefore surface area) during the battery operation. In ultra-thin Si films high stability is achieved because the film surface area does not change during cycling and the volume changes are accommodated largely via variation in film thickness. Thus maintaining a stable SEI is not a challenge. In thicker films that exhibit cracks at the current collector-Si interface and thus experience some surface area changes, electrolyte additives are needed to achieve a stable SEI. In free-standing Si nanowires that do not need a binder, but experience much more significant surface area changes upon cycling, the unprotected Si fails to maintain a stable SEI, causing continuous Li consumption, increasing Si surface roughness and decreasing CE with every cycle. Si nanowires commonly demonstrate CE of only 93-97%. In contrast, electrodes described herein show improving CE with every cycle, as illustrated in FIG. 17, suggesting that the alginate binder contributes to building a stable passivating SEI layer. The alginate-based electrodes demonstrate an average CE of 98.5% for the first 100 cycles and an average CE of 99.9% for cycles 101-300. In order to test the hypothesis that Na-alginate assists in building a stable SEI XPS studies on the electrodes before and after cycling were performed, and the results are illustrated in FIGS. 18A-C. Indeed, the surface chemistry of the SEI did not noticeably change between the 10$^{th}$ and 200$^{th}$ cycle, suggesting excellent SEI stability and fully supporting our hypothesis. A similar positive impact on improving CE was also observed with a CMC binder, but only when its relative amount is several times higher.

Nonetheless, even if the stability of the SEI and binder-Si interface is achieved, binders that show virtually no extensibility (CMC, PAA and alginate) require the Si electrode to possess sufficient pore volume, needed for Si expansion. Indeed, increasing the pore volume of CMC-based Si electrodes significantly improved their stability. The lack of sufficient pore volume may cause sealing of the inter-particle pores (and thus a dramatic reduction in the ion transport) and mechanical failure of the electrode during operation. The smallest sufficient pore volume should be larger than the total volume of Si expansion for several reasons. First, the shape of the Si particles and the shape of the pores are different. Therefore, at the fully expanded state some pore volume will remain unfilled. Note that plastic deformation of lithiated Si nanoparticles may take place, thereby reducing the strictness of the requirements on local pore shape and size. However, strong bonding of the binder to Si particles and high binder stiffness is needed because the endurance limit of the binder and the binder-Si interface must exceed the internal stresses in the electrode caused by the volume expansion of Si nanoparticles. Second, the SEI formation requires some available volume as well. Furthermore, at the expanded state Si particles could be pressed against each other, inducing highly undesirable damage in the SEI. Finally, open pores not filled with any electrolyte decomposition products are needed for the rapid transport of Li ions within the electrode. Too large a pore volume, however, will lead to a decrease in the volumetric capacity of the anode. Since the considerations discussed above make it difficult to precisely predict the minimum pore volume, additional experiments to intentionally densify the electrodes were performed. When the electrode density was increased to ~0.75 g/cc (the total pore volume equal to 2.7 time the volume occupied by Si particles), the electrodes showed noticeably worse performance. Therefore, it is estimated that the ideal pore volume is somewhere between 3 and 6 the volume of Si component of the electrode, provided the binder has properties similar to that of alginate or CMC.

Since the mechanical properties of Na-CMC and Na-alginate are similar, and since both binders do not interact with electrolytes, the dramatic difference in their performance in Si electrodes of similar porosity levels is most likely linked to the concentration of functional groups bonded to Si surface. In alginate carboxylic groups are naturally present and evenly distributed in the polymer chain, while in CMC they are synthetically induced and their distribution is random, where some monomeric units may have more than one carboxylic group, and other have none. The higher concentration and a more uniform distribution of the carboxylic groups along the chain in alginate could be responsible for the better transport of Li ions in vicinity of Si particles, more uniform coverage and more efficient assistance in the formation of a stable SEI layer on the Si surface (FIGS. 18A-18C). Alginate macromolecules are also much more polar than the CMC polymer chains, which can ensure better interfacial interaction between the polymer binder and the particles and stronger adhesion between the electrode layer and Cu substrate. This large difference in chemistry of CMC and alginate results in major differences in their behavior. For example, the alginate solution in water has dramatically higher viscosity than CMC (FIG. 1A). This high viscosity prevents Si particles from sedimentation and aggregation during the electrode formation, as water is evaporating, resulting in high slurry uniformity. This uniformity is known to be critical for obtaining uniform distribution of active materials within the anode needed for the long-term electrode stability. Alginate solution also exhibits much higher degree of shear-thinning behavior (FIGS. 1B, 1C), which offers an opportunity to lower a slurry viscosity needed for fast homogenization by increasing the mixing rate and an opportunity to increase a slurry viscosity for porosity and uniformity control during the electrode formation by lowering the mixing rate. To achieve viscosity comparable to alginate solutions, significantly higher CMC content is needed. Similarly, in order to get a remotely comparable performance with a CMC binder one needs to increase the binder:Si ratio by a factor of four. The high binder content decreases the electrical conductivity of the electrode and necessitates the utilization of a higher content of the conductive carbon additives (increasing the C:Si ratio by the factor of three), which inevitably lowers the electrode specific capacity.

Figure 19:
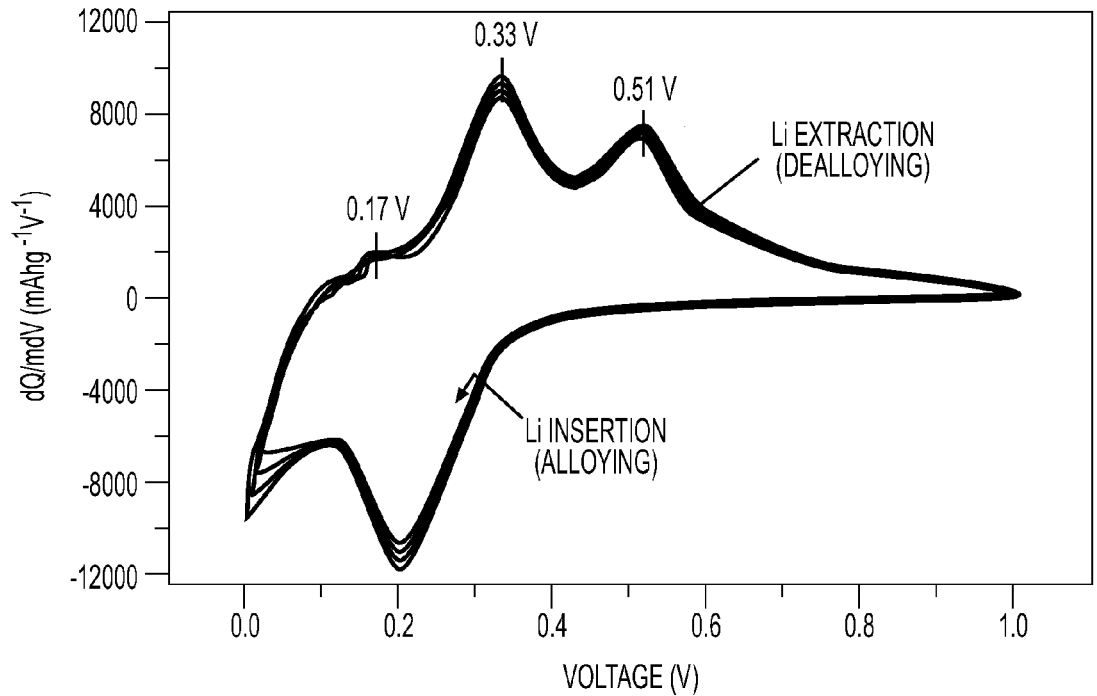
FIG. 19 graphically illustrate differential capacity curves for lithium insertion into and lithium extraction from the Si, C, and alginate-containing composite electrode.

To further characterize the behavior of the alginate-based electrode cyclic voltammetry experiments were performed. The differential capacity curves show one broad Li insertion (cathodic) peak at about 0.21 V and two Li extraction (anodic) peaks at 0.33 V and 0.51 V, shown in FIG. 19, all commonly observed in Si anodes. The origin of the potential difference between the corresponding peaks in the cathodic and anodic directions has been the subject of recent discussions and is commonly modeled by a thermodynamic (rate independent) hysteresis. The physics behind the hysteresis is not yet well understood. The first 0.33 V anodic peak is not always observed. In some Si—C nanocomposite particles, for example, only one Li extraction peak at about 0.5 V appears. Therefore, the 0.33 V peak could be related to the surface properties of Si. A small Li extraction peak observed at about 0.17 V corresponds to Li deintercalation from C additives. The five cyclic voltammetry cycles demonstrate high reproducibility, indicative of good anode stability.

Figure 20:
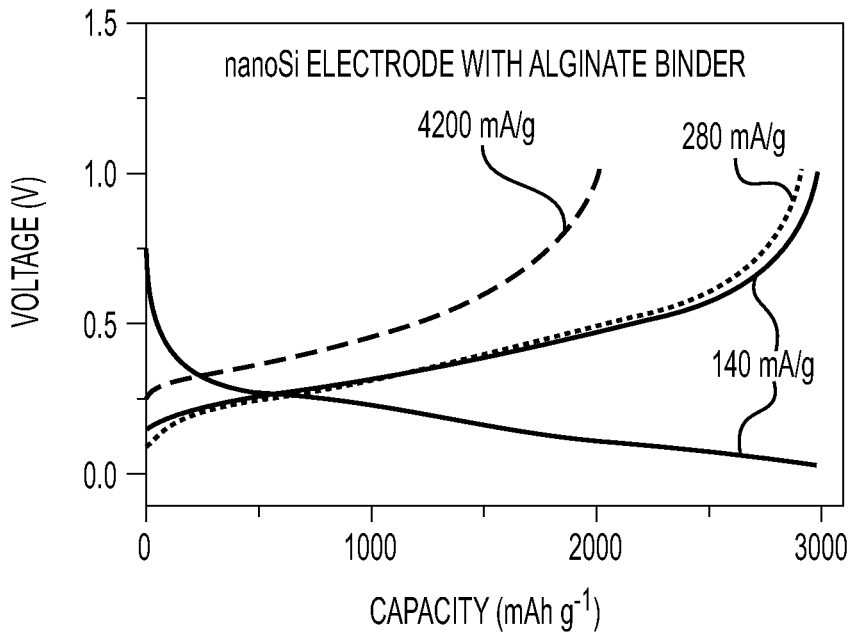
FIGS. 20 and 21 graphically illustrate the shape of the galvanostatic lithium insertion and extraction profiles of the Si, C, and alginate-containing composite electrode.
Figure 21:
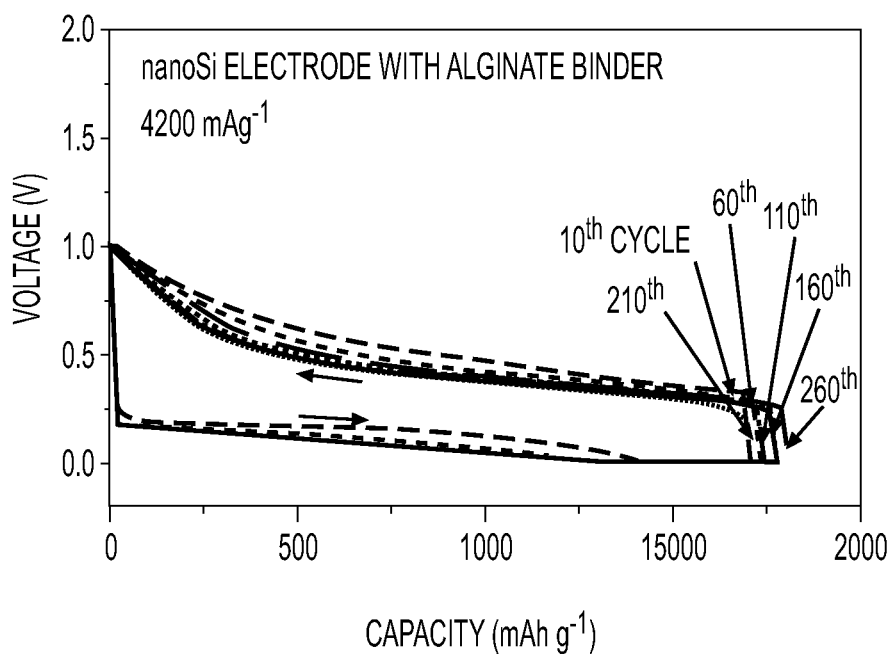

FIGS. 20 and 21 show the shape of the galvanostatic Li insertion and extraction profiles for the produced Si anodes. The shapes of the profiles are similar to the profiles previously reported in literature for other Si electrodes. In contrast to intercalation-type electrode materials, these profiles do not exhibit strictly horizontal plateaus and cover a larger potential range. Interestingly, the Li extraction profiles become more horizontal and exhibit slightly smaller overpotential with cycling, suggesting a gradual improvement in the discharge kinetics. The current-dependent overpotential increases the Li extraction potential when current density is increased from 140 to 4200 mA/g. By comparing the Li extraction capacities achieved at different current densities, we can conclude that these electrodes possess only moderate rate capability, inferior to that achieved in Si—C composite anodes with hierarchical porosity or in Si nanowires and much inferior to what can be achieved in supercapacitors. The advantage of this traditional battery technology, however, is higher volumetric capacity, higher CE and compatibility with existing manufacturing techniques. Further electrode optimization and introduction of additional pores is expected to significantly increase the rate performance, because the diffusion of Li into/out of Si nanoparticles can be achieved within minutes.

Figure 22:
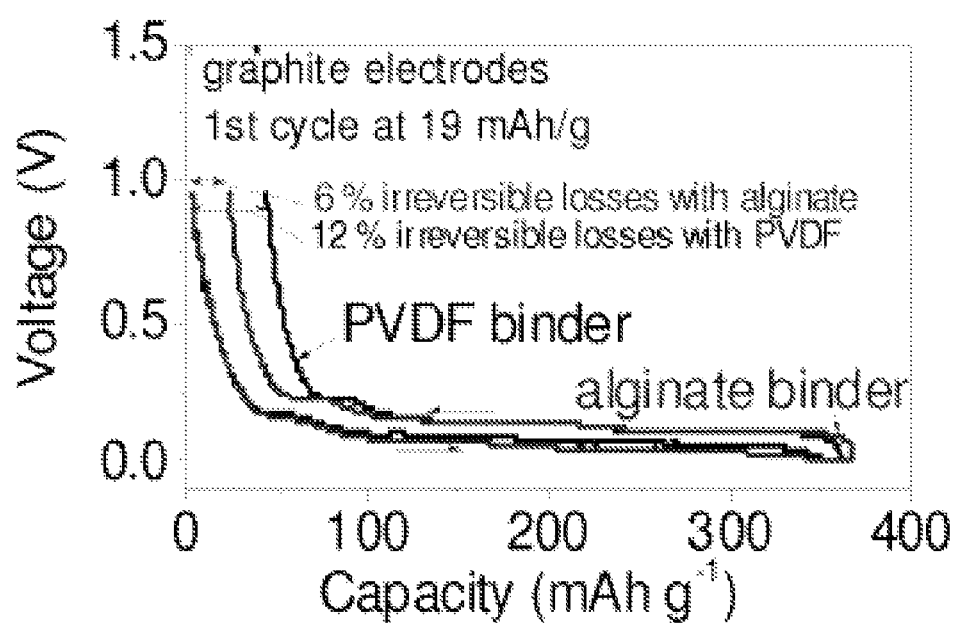
FIG. 22 graphically compares first charge-discharge profiles of the graphite and alginate-containing electrode.

In addition to improving the stability and CE of Si anodes, the alginate properties provide advantages to other electrodes, such as traditional graphitic anodes. FIG. 22 compares the first charge-discharge profiles of graphitic anodes made with a traditional PVDF binder and with a Na-alginate one. Replacing PVDF with lower cost, environmentally-friendly alginate not only improves the anode discharge capacity, but also increases the first cycle CE from 88 to 94%. The stronger bonding to graphite likely allowed the alginate to achieve a higher electrochemical utilization of the active material. Commercial anodes demonstrate cycle life up to ~5,000 cycles, and their degradation is caused by the deterioration of the SEI layer and electrode integrity due to small volume changes in the graphite during cycling. It might be expected that the stronger bonding, higher stiffness and the presence of high concentration of precisely positioned carboxylate functional groups in alginate may similarly improve the SEI stability and cycle life of graphite and other anode materials while simultaneously lowering the anode production cost and improving the environmental friendliness of the overall fabrication process, providing an immediate impact to our society.

Alginate, an attractive abundant low-cost environmentally friendly renewable material produced by photosynthesis in algae, offers outstanding performance as a binder in battery electrodes, unmatched by the current technology, as well as a separator material and/or a coating at the surface of the electrode.

While the present disclosure has been described in connection with a plurality of exemplary aspects, it is understood that other similar aspects can be used or modifications and additions can be made to the described aspects for performing the same function of the present disclosure without deviating therefrom. Therefore, the present disclosure should not be limited to any single aspect, but rather construed in breadth and scope in accordance with the appended claims.

What is claimed is:

1. A battery electrode comprising:
   a conductive metal substrate; and
   an electrode active material comprising active particles, wherein each of the active particles is a silicon-carbon composite in the form of silicon-coated carbon, wherein (i) the silicon comprises $sp^3$ bonded silicon atoms and (ii) the carbon comprises $sp^2$ bonded carbon atoms, dispersed in a binder coupled to the conductive metal substrate, wherein the binder comprises an alginate material, wherein the electrode active material is substantially homogenously dispersed in the alginate material, and wherein the active particles comprise about 50 weight percent to about 95 weight percent silicon and about 5 weight percent to about 50 weight percent carbon.

2. The electrode of claim 1, wherein the electrode active material further comprises a conductive carbon additive mixed in with the active particles.

3. The electrode of claim 1, wherein the silicon-carbon composites have a three-dimensional dendritic particle structure.

4. The electrode of claim 1, wherein the alginate material comprises a salt of alginic acid.

5. The electrode of claim 4, wherein the salt of alginic acid comprises an alkaline salt of alginic acid or an alkaline earth salt of alginic acid.

6. The electrode of claim 1, wherein the binder further comprises a polymer.

7. The electrode of claim 1, wherein the binder further comprises a polymer blended with the alginate material.

8. The electrode of claim 1, wherein the binder further comprises a polymer grafted with or cross-linked with the alginate material.

9. The electrode of claim 1, wherein the silicon-carbon composite is an electrical conductor.

10. The electrode of claim 1, wherein the active particles are in the form of spheres.

11. The electrode of claim 1, wherein the silicon-coated carbon composite comprises the silicon discontinuously coated over a surface of the carbon in the form of nanoparticles.

* * * * *